(12) United States Patent
Stach et al.

(10) Patent No.: US 10,872,392 B2
(45) Date of Patent: Dec. 22, 2020

(54) GENERATING ARTISTIC DESIGNS ENCODED WITH ROBUST, MACHINE-READABLE DATA

(71) Applicant: Digimarc Corporation, Beaverton, OR (US)

(72) Inventors: John F. Stach, Portland, OR (US); Ravi K. Sharma, Portland, OR (US); Christopher A. Ambiel, Milwaukie, OR (US); Ajith M. Kamath, Beaverton, OR (US)

(73) Assignee: Digimarc Corporation, Beaverton, OR (US)

( * ) Notice: Subject to any disclaimer, the term of this patent is extended or adjusted under 35 U.S.C. 154(b) by 283 days.

(21) Appl. No.: 16/129,487

(22) Filed: Sep. 12, 2018

(65) Prior Publication Data

US 2019/0139176 A1    May 9, 2019

Related U.S. Application Data

(60) Provisional application No. 62/582,871, filed on Nov. 7, 2017.

(51) Int. Cl.
*G06T 1/00* (2006.01)
*G06T 11/60* (2006.01)
(Continued)

(52) U.S. Cl.
CPC ........ *G06T 1/005* (2013.01); *G06K 19/06103* (2013.01); *G06T 1/0028* (2013.01);
(Continued)

(58) Field of Classification Search
CPC . G06K 19/06103; G06T 1/0028; G06T 1/005; G06T 1/0071; G06T 1/0092;
(Continued)

(56) References Cited

U.S. PATENT DOCUMENTS

| | | |
|---|---|---|
| 5,329,108 A | 7/1994 | Lamoure |
| 5,416,312 A | 5/1995 | Lamoure |

(Continued)

FOREIGN PATENT DOCUMENTS

| | | |
|---|---|---|
| EP | 0638614 A1 | 2/1995 |
| EP | 1367810 A2 | 12/2003 |

(Continued)

OTHER PUBLICATIONS

Ando, et al, Image Recognition Based Digital Watermarking Technology for Item Retrieval in Convenience Stores, NTT Technical Review, vol. 15, No. 8, Aug. 2017. (2 pages).

(Continued)

*Primary Examiner* — Bobbak Safaipour
(74) *Attorney, Agent, or Firm* — Digimarc Corporation

(57) ABSTRACT

Artwork carrying machine readable data is generated by editing artwork according to a data signal or transforming the data signal into artwork. The machine-readable data signal is generated from a digital payload and converted into an image tile. Artwork is edited according to the image tile by moving graphic elements, adapting intersections of lines, or altering line density, among other techniques. Artwork is generated from the data signal by skeletonizing it and applying morphological operators to a skeletal representation, such as a medial axis transform. Artistic effects are introduced by filtering the data signal with directional blurring or shape filters.

22 Claims, 17 Drawing Sheets

(51) Int. Cl.
*G06T 3/20* (2006.01)
*G06T 5/30* (2006.01)
*G06T 5/00* (2006.01)
*G06K 19/06* (2006.01)

(52) U.S. Cl.
CPC .......... *G06T 1/0071* (2013.01); *G06T 1/0092* (2013.01); *G06T 3/20* (2013.01); *G06T 5/002* (2013.01); *G06T 5/30* (2013.01); *G06T 11/60* (2013.01); *G06T 2201/0051* (2013.01); *G06T 2201/0061* (2013.01); *G06T 2201/0202* (2013.01); *G06T 2201/0601* (2013.01); *G06T 2207/20044* (2013.01)

(58) Field of Classification Search
CPC ............. G06T 11/60; G06T 2201/0051; G06T 2201/0061; G06T 2201/0202; G06T 2201/0601; G06T 2207/20044; G06T 3/20; G06T 5/002; G06T 5/30
See application file for complete search history.

(56) References Cited

U.S. PATENT DOCUMENTS

| | | | |
|---|---|---|---|
| 5,444,779 | A | 8/1995 | Daniele |
| 5,453,605 | A | 9/1995 | Hecht |
| 5,521,372 | A | 5/1996 | Hecht |
| 5,542,971 | A | 8/1996 | Auslander |
| 5,576,532 | A | 11/1996 | Hecht |
| 5,636,292 | A | 6/1997 | Rhoads |
| 5,745,604 | A | 4/1998 | Rhoads |
| 5,752,152 | A | 5/1998 | Gasper |
| 5,790,703 | A | 8/1998 | Wang |
| 5,832,119 | A | 11/1998 | Rhoads |
| 5,843,564 | A | 12/1998 | Gasper |
| 5,859,920 | A | 1/1999 | Daly |
| 5,862,260 | A | 1/1999 | Rhoads |
| 5,919,730 | A | 7/1999 | Gasper |
| 5,998,609 | A | 12/1999 | Aoki |
| 6,011,857 | A | 1/2000 | Sowell |
| 6,076,738 | A | 6/2000 | Bloomberg |
| 6,122,392 | A | 9/2000 | Rhoads |
| 6,122,403 | A | 9/2000 | Rhoads |
| 6,149,719 | A | 11/2000 | Houle |
| 6,168,081 | B1 | 1/2001 | Urano |
| 6,177,683 | B1 | 1/2001 | Kolesar |
| 6,246,778 | B1 | 6/2001 | Moore |
| 6,345,104 | B1 | 2/2002 | Rhoads |
| 6,361,916 | B1 | 3/2002 | Chen |
| 6,373,965 | B1 | 4/2002 | Liang |
| 6,441,380 | B1 | 8/2002 | Lawandy |
| 6,449,377 | B1 | 9/2002 | Rhoads |
| 6,456,729 | B1 | 9/2002 | Moore |
| 6,522,767 | B1 | 2/2003 | Moskowitz |
| 6,567,532 | B1 | 5/2003 | Honsinger |
| 6,567,534 | B1 | 5/2003 | Rhoads |
| 6,590,996 | B1 | 7/2003 | Reed |
| 6,603,864 | B1 | 8/2003 | Matsunoshita |
| 6,614,914 | B1 | 9/2003 | Rhoads |
| 6,625,297 | B1 | 9/2003 | Bradley |
| 6,683,966 | B1 | 1/2004 | Tian |
| 6,692,031 | B2 | 2/2004 | McGrew |
| 6,694,041 | B1 | 2/2004 | Brunk |
| 6,698,860 | B2 | 3/2004 | Berns |
| 6,706,460 | B1 | 3/2004 | Williams |
| 6,718,046 | B2 | 4/2004 | Reed |
| 6,760,464 | B2 | 7/2004 | Brunk |
| 6,775,391 | B2 | 8/2004 | Hosaka |
| 6,775,394 | B2 | 8/2004 | Yu |
| 6,786,397 | B2 | 9/2004 | Silverbrook |
| 6,804,377 | B2 | 10/2004 | Reed |
| 6,829,063 | B1 | 12/2004 | Allebach |
| 6,839,450 | B2 | 1/2005 | Yen |
| 6,912,674 | B2 | 6/2005 | Trelewicz |
| 6,940,993 | B2 | 9/2005 | Jones |
| 6,947,571 | B1 | 9/2005 | Rhoads |
| 6,961,442 | B2 | 11/2005 | Hannigan |
| 6,987,861 | B2 | 1/2006 | Rhoads |
| 6,993,152 | B2 | 1/2006 | Patterson |
| 6,995,859 | B1 | 2/2006 | Silverbrook |
| 6,996,252 | B2 | 2/2006 | Reed |
| 7,072,490 | B2 | 7/2006 | Stach |
| 7,076,082 | B2 | 7/2006 | Sharma |
| 7,114,657 | B2 | 10/2006 | Auslander |
| 7,152,021 | B2 | 12/2006 | Alattar |
| 7,218,750 | B1 | 5/2007 | Hiraishi |
| 7,231,061 | B2 | 6/2007 | Bradley |
| 7,280,672 | B2 | 10/2007 | Powell |
| 7,321,667 | B2 | 1/2008 | Stach |
| 7,340,076 | B2 | 3/2008 | Stach |
| 7,352,878 | B2 | 4/2008 | Reed |
| 7,412,072 | B2 | 8/2008 | Sharma |
| 7,529,385 | B2 | 5/2009 | Lawandy |
| 7,532,741 | B2 | 5/2009 | Stach |
| 7,536,553 | B2 | 5/2009 | Auslander |
| 7,555,139 | B2 | 6/2009 | Rhoads |
| 7,559,983 | B2 | 7/2009 | Starling |
| 7,684,088 | B2 | 3/2010 | Jordan |
| 7,721,879 | B2 | 5/2010 | Weaver |
| 7,738,673 | B2 | 6/2010 | Reed |
| 7,757,952 | B2 | 7/2010 | Tuschel |
| 7,800,785 | B2 | 9/2010 | Bala |
| 7,831,062 | B2 | 11/2010 | Stach |
| 7,856,143 | B2 | 12/2010 | Abe |
| 7,892,338 | B2 | 2/2011 | Degott |
| 7,926,730 | B2 | 4/2011 | Auslander |
| 7,965,862 | B2 | 6/2011 | Jordan |
| 7,986,807 | B2 | 7/2011 | Stach |
| 8,009,893 | B2 | 8/2011 | Rhoads |
| 8,064,100 | B2 | 11/2011 | Braun |
| 8,144,368 | B2 | 3/2012 | Rodriguez |
| 8,157,293 | B2 | 4/2012 | Bhatt |
| 8,159,657 | B2 | 4/2012 | Degott |
| 8,180,174 | B2 | 5/2012 | Di |
| 8,194,919 | B2 | 6/2012 | Rodriguez |
| 8,223,380 | B2 | 7/2012 | Lapstun |
| 8,227,637 | B2 | 7/2012 | Cohen |
| 8,301,893 | B2 | 10/2012 | Brundage |
| 8,345,315 | B2 | 1/2013 | Sagan |
| 8,360,323 | B2 | 1/2013 | Widzinski |
| 8,412,577 | B2 | 4/2013 | Rodriguez |
| 8,515,121 | B2 | 8/2013 | Stach |
| 8,593,696 | B2 | 11/2013 | Picard |
| 8,687,839 | B2 | 4/2014 | Sharma |
| 8,699,089 | B2 | 4/2014 | Eschbach |
| 8,730,527 | B2 | 5/2014 | Chapman |
| 8,805,110 | B2 | 8/2014 | Rodriguez |
| 8,840,029 | B2 | 9/2014 | Lawandy |
| 8,867,782 | B2 | 10/2014 | Kurtz |
| 8,879,735 | B2 | 11/2014 | Lord |
| 8,913,299 | B2 | 12/2014 | Picard |
| 9,008,315 | B2 | 4/2015 | Lord |
| 9,013,501 | B2 | 4/2015 | Scheibe |
| 9,055,239 | B2 | 6/2015 | Tehranchi |
| 9,064,228 | B2 | 6/2015 | Woerz |
| 9,070,132 | B1 | 6/2015 | Durst |
| 9,087,376 | B2 | 7/2015 | Rodriguez |
| 9,269,022 | B2 | 2/2016 | Rhoads |
| 9,275,428 | B2 | 3/2016 | Chapman |
| 9,319,557 | B2 | 4/2016 | Chapman |
| 9,380,186 | B2 | 6/2016 | Reed |
| 9,400,951 | B2 | 7/2016 | Yoshida |
| 9,401,001 | B2 | 7/2016 | Reed |
| 9,449,357 | B1 | 9/2016 | Lyons |
| 9,562,998 | B2 | 2/2017 | Edmonds |
| 9,593,982 | B2 | 3/2017 | Rhoads |
| 9,635,378 | B2 | 4/2017 | Holub |
| 9,690,967 | B1 | 6/2017 | Brundage |
| 9,747,656 | B2 | 8/2017 | Stach |
| 9,749,607 | B2 | 8/2017 | Boles |
| 9,754,341 | B2 | 9/2017 | Falkenstern |
| 10,223,560 | B2 | 3/2019 | Boles |
| 10,304,151 | B2 | 5/2019 | Falkenstern |
| 10,424,038 | B2 | 9/2019 | Holub |

(56) References Cited

U.S. PATENT DOCUMENTS

| | | |
|---|---|---|
| 10,594,689 B1* | 3/2020 | Weaver .............. G10L 19/018 |
| 2001/0037455 A1 | 11/2001 | Lawandy |
| 2002/0054356 A1 | 5/2002 | Kurita |
| 2002/0080396 A1 | 6/2002 | Silverbrook |
| 2002/0085736 A1 | 7/2002 | Kalker |
| 2002/0136429 A1 | 9/2002 | Stach |
| 2002/0147910 A1 | 10/2002 | Brundage |
| 2002/0169962 A1 | 11/2002 | Brundage |
| 2003/0005304 A1 | 1/2003 | Lawandy |
| 2003/0012548 A1 | 1/2003 | Levy |
| 2003/0021437 A1 | 1/2003 | Hersch |
| 2003/0039376 A1 | 2/2003 | Stach |
| 2003/0053654 A1 | 3/2003 | Patterson |
| 2003/0063319 A1 | 4/2003 | Umeda |
| 2003/0116747 A1 | 6/2003 | Lem |
| 2003/0156733 A1 | 8/2003 | Zeller |
| 2003/0174863 A1 | 9/2003 | Brundage |
| 2004/0023397 A1 | 2/2004 | Vig |
| 2004/0032972 A1 | 2/2004 | Stach |
| 2004/0046032 A1 | 3/2004 | Urano |
| 2004/0146177 A1 | 7/2004 | Kalker |
| 2004/0149830 A1 | 8/2004 | Allen |
| 2005/0127176 A1 | 6/2005 | Dickinson |
| 2006/0022059 A1 | 2/2006 | Juds |
| 2006/0078159 A1 | 4/2006 | Hamatake |
| 2006/0115110 A1 | 6/2006 | Rodriguez |
| 2006/0147082 A1 | 7/2006 | Jordan |
| 2006/0165311 A1 | 7/2006 | Watson |
| 2007/0102920 A1 | 5/2007 | Bi |
| 2007/0152032 A1 | 7/2007 | Tuschel |
| 2007/0152056 A1 | 7/2007 | Tuschel |
| 2007/0192872 A1* | 8/2007 | Rhoads .............. H04N 1/32144 726/26 |
| 2007/0210164 A1 | 9/2007 | Conlon |
| 2007/0221732 A1 | 9/2007 | Tuschel |
| 2007/0262154 A1 | 11/2007 | Zazzu |
| 2007/0262579 A1 | 11/2007 | Bala |
| 2008/0112590 A1 | 5/2008 | Stach |
| 2008/0149820 A1 | 6/2008 | Jordan |
| 2008/0159615 A1 | 7/2008 | Rudaz |
| 2008/0164689 A1 | 7/2008 | Jordan |
| 2008/0277626 A1 | 11/2008 | Yang |
| 2009/0040022 A1 | 2/2009 | Finkenzeller |
| 2009/0059299 A1 | 3/2009 | Yoshida |
| 2009/0129592 A1 | 5/2009 | Swiegers |
| 2009/0158318 A1 | 6/2009 | Levy |
| 2009/0266877 A1 | 10/2009 | Vonwiller |
| 2010/0025476 A1 | 2/2010 | Widzinski |
| 2010/0048242 A1 | 2/2010 | Rhoads |
| 2010/0062194 A1 | 3/2010 | Sun |
| 2010/0119108 A1 | 5/2010 | Rhoads |
| 2010/0150434 A1 | 6/2010 | Reed |
| 2010/0317399 A1 | 12/2010 | Rodriguez |
| 2011/0007092 A1 | 1/2011 | Ihara |
| 2011/0008606 A1 | 1/2011 | Sun |
| 2011/0051989 A1 | 3/2011 | Gao |
| 2011/0085209 A1 | 4/2011 | Man |
| 2011/0091066 A1 | 4/2011 | Alattar |
| 2011/0111210 A1 | 5/2011 | Matsunami |
| 2011/0127331 A1 | 6/2011 | Zhao |
| 2011/0214044 A1 | 9/2011 | Davis |
| 2011/0249051 A1 | 10/2011 | Chretien |
| 2011/0249332 A1 | 10/2011 | Merrill |
| 2011/0255163 A1 | 10/2011 | Merrill |
| 2012/0014557 A1 | 1/2012 | Reed |
| 2012/0065313 A1 | 3/2012 | Demartin |
| 2012/0074220 A1 | 3/2012 | Rodriguez |
| 2012/0078989 A1 | 3/2012 | Sharma |
| 2012/0133954 A1 | 5/2012 | Takabayashi |
| 2012/0205435 A1 | 8/2012 | Woerz |
| 2012/0214515 A1 | 8/2012 | Davis |
| 2012/0218608 A1 | 8/2012 | Maltz |
| 2012/0224743 A1 | 9/2012 | Rodriguez |
| 2012/0229467 A1 | 9/2012 | Czerwinski |
| 2012/0243797 A1 | 9/2012 | Di |
| 2012/0275642 A1 | 11/2012 | Aller |
| 2012/0311623 A1 | 12/2012 | Davis |
| 2013/0001313 A1 | 1/2013 | Denniston, Jr. |
| 2013/0114876 A1 | 5/2013 | Rudaz |
| 2013/0223673 A1 | 8/2013 | Davis |
| 2013/0259297 A1 | 10/2013 | Knudson |
| 2013/0260727 A1 | 10/2013 | Knudson |
| 2013/0286443 A1 | 10/2013 | Massicot |
| 2013/0329006 A1 | 12/2013 | Boles |
| 2013/0335783 A1 | 12/2013 | Kurtz |
| 2014/0022603 A1 | 1/2014 | Eschbach |
| 2014/0052555 A1 | 2/2014 | MacIntosh |
| 2014/0084069 A1 | 3/2014 | Mizukoshi |
| 2014/0108020 A1 | 4/2014 | Sharma |
| 2014/0245463 A1 | 8/2014 | Suryanarayanan |
| 2014/0293091 A1 | 10/2014 | Rhoads |
| 2014/0325656 A1 | 10/2014 | Sallam |
| 2014/0339296 A1 | 11/2014 | McAdams |
| 2015/0071485 A1 | 3/2015 | Rhoads |
| 2015/0156369 A1 | 6/2015 | Reed |
| 2015/0187039 A1 | 7/2015 | Reed |
| 2015/0286873 A1 | 10/2015 | Davis |
| 2015/0317923 A1 | 11/2015 | Edmonds |
| 2016/0180207 A1 | 6/2016 | Rodriguez |
| 2016/0196630 A1 | 7/2016 | Blesser |
| 2016/0217546 A1 | 7/2016 | Ryu |
| 2016/0217547 A1 | 7/2016 | Stach |
| 2016/0225116 A1 | 8/2016 | Tehranchi |
| 2016/0267620 A1 | 9/2016 | Calhoon |
| 2016/0275639 A1 | 9/2016 | Holub |
| 2017/0024840 A1 | 1/2017 | Holub |
| 2017/0024845 A1 | 1/2017 | Filler |
| 2017/0230533 A1 | 8/2017 | Holub |
| 2018/0068463 A1 | 3/2018 | Risser |
| 2018/0082407 A1 | 3/2018 | Rymkowski |
| 2018/0082715 A1 | 3/2018 | Rymkowski |
| 2018/0158224 A1 | 6/2018 | Bethge |
| 2018/0189619 A1 | 7/2018 | Garak |
| 2018/0211157 A1 | 7/2018 | Liu |
| 2018/0285679 A1 | 10/2018 | Amitay |
| 2018/0357800 A1 | 12/2018 | Oxholm |
| 2018/0373999 A1 | 12/2018 | Xu |
| 2019/0139176 A1 | 5/2019 | Stach |
| 2019/0213705 A1 | 7/2019 | Kamath |
| 2019/0266369 A1 | 8/2019 | Boles |
| 2019/0378235 A1* | 12/2019 | Kamath .............. H04N 1/32309 |

FOREIGN PATENT DOCUMENTS

| | | |
|---|---|---|
| EP | 1370062 A1 | 12/2003 |
| EP | 3016062 A1 | 5/2016 |
| JP | 2017073696 A | 4/2017 |
| WO | 2006048368 | 5/2006 |
| WO | 2010075363 | 7/2010 |
| WO | 2011029845 | 3/2011 |
| WO | 2011029845 A2 | 3/2011 |
| WO | 2015077493 A1 | 5/2015 |
| WO | 2016153911 A1 | 9/2016 |
| WO | 2016153936 | 9/2016 |
| WO | 2018111786 | 6/2018 |

OTHER PUBLICATIONS

Aug. 22, 2016 International Search Report and Written Opinion, including search strategy, from PCT/US2016/022836 (published as WO 2016/153911) (23 pages).

Caldelli et al., "Geometric-Invariant Robust Watermarking Through Constellation Matching in the Frequency Domain," IEEE Proc. Int. Conf. on Image Processing, vol. 2, Sep. 2000, pp. 65-68.

Chao Ke et al, "Kernel target alignment for feature kernel selection in universal steganographic detection based on multiple kernel SVM", Instrumentation&Measurement, Sensor Network and Automation (IMSNA), 2012 International Symposium on, IEEE, (Aug. 25, 2012), doi:10.1109/MSNA.2012.6324554, ISBN 978-1-4673-2465-6, pp. 222-227, XP032456671.

(56) References Cited

OTHER PUBLICATIONS

Cheng, et al., "Colloidal silicon quantum dots: from preparation to the modification of self-assembled monolayers (SAMs) for bio-applications," Chem. Soc. Rev., 2014, 43, 2680-2700. (21 pgs.).
Chu, et al, Halftone QR codes, ACM Transactions on Graphics, vol. 32, No. 6, Nov. 1, 2013, p. 217.
Davis B, Signal rich art: enabling the vision of ubiquitous computing. In Media Watermarking, Security, and Forensics III 2011 Feb. 8 (vol. 7880, p. 788002). International Society for Optics and Photonics.
European Patent Office Communication pursuant to Article 94(3) EPC for Application No. 16769366.2, which is the regional phase of PCT/US2016/022836 (published as WO 2016/153911), dated May 24, 2019, 7 pages.
Feb. 26, 2018 Response and Claim amendments in European patent application No. 16769366.2, which is the regional phase of PCT/US2016/022836 (published as WO 2016/153911) (8 pages).
Gatys, et al, A Neural Algorithm of Artistic Style. arXiv preprint arXiv:1508.06576, Aug. 26, 2015. 16 pages.
International Search Report and Written Opinion for Application No. PCT/US19/36126, dated Oct. 9, 2019, 12 pages.
International Search Report and Written Opinion for Application No. PCT/US2018/050677, dated May 10, 2019, 14 pages.
International Search Report and Written Opinion for Application No. PCT/US2019/019410, dated Aug. 12, 2019, 19 pages. (published as WO2019/165364).
International Search Report and Written Opinion in PCT/US2016/22967 dated Jul. 11, 2016. (17 pgs.) (published as WO2016/153936).
Invitation to Pay Additional Fees including Communication Relating to the Results of the Partial International Search in PCT/US2018/064516, dated Apr. 5, 2019. 17 pages.
J. Collins et al., "Intelligent Material Solutions, Covert Tagging and Serialization Systems", Proc. IS&T's NIP 29 International Conference on Digital Printing Technologies, pp. 153-157 (2013). (5 pgs.).
Jamie Hayes et al, "Generating Steganographic Images via Adversarial Training", Proceedings of the 31st annual conference on advances in Neural Information Processing Systems (NIPS'30), ISBN 978-1-5108-6096-4, (Mar. 1, 2017), pp. 1951-1960, URL: http://papers.nips.cc/paper/6791-generating-steganographic-images-via-adversarial-training.pdf, (Mar. 22, 2019), XP055573249.
Japanese Patent Application JP2017022489, with machine translation, Jan. 26, 2017. (51 pages).
Japanese Patent Application JP2017183948, with machine translation, Oct. 5, 2017. (36 pages).
Johnson, et al, Perceptual losses for real-time style transfer and super-resolution, European Conference on Computer Vision, Oct. 8, 2016, pp. 694-711.
Johnson, excerpts from github web site "Fast-neural-style," Nov. 19, 2017. 19 pages.
Jun-Yan Zhu et al, "Unpaired Image-to-Image Translation Using Cycle-Consistent Adversarial Networks", 2017 IEEE International Conference on Computer Vision (ICCV), (Mar. 30, 2017), doi:10.1109/ICCV.2017.244, ISBN 978-1-5386-1032-9, pp. 2242-2251, XP055573065.
Katayama, et al, New High-speed Frame Detection Method: Side Trace Algorithm (STA) for i-appli on Cellular Phones to Detect Watermarks, Proceedings of the ACM 3rd International Conference on Mobile and Ubiquitous Multimedia, pp. 109-116, 2004.
Kiyoto et al, Development of a Near-Infrared Reflective Film Using Disk-Shaped Nanoparticles, Fujifilm Research and Development Report No. 58-2013, 2013. (4 pgs.).
Konstantinos A Raftopoulos et al., "Region-Based Watermarking for Images," Mar. 15, 2017, Operations Research, Engineering, and Cyber Security, Springer, pp. 331-343, XP009512871, IBSN: 978-3-319-51498-7.
Lengstrom, excerpts from github web site, "Fast Style Transfer in TensorFlow," Oct. 3, 2017. 24 pages.
Lin, et al, Artistic QR code embellishment. Computer Graphics Forum, Oct. 1, 2013, vol. 32, No. 7, pp. 137-146.
Lin, et al, Efficient QR code beautification with high quality visual content, IEEE Transactions on Multimedia, vol. 17, No. 9, Sep. 2015, pp. 1515-1524.
Liu, et al, Line-based cubism-like image—A new type of art image and its application to lossless data hiding, IEEE Transactions on Information Forensics and Security, vol. 7, No. 5, Oct. 2012, pp. 1448-1458.
Machine Translation of JP2017-073696A, generated Aug. 28, 2018. (54 pages).
Nakamura, et al, Fast Watermark Detection Scheme for Camera-Equipped Cellular Phone, Proceedings of the ACM 3rd International Conference on Mobile and Ubiquitous Multimedia, pp. 101-108, 2004.
Nikulin, Exploring the neural algorithm of artistic style, arXiv preprint arXiv:1602.07188, Feb. 23, 2016. 15 pages.
Park et al.; Invisible Marker Based Augmented Reality System, SPIE Proc., vol. 5960, 2005, pp. 501-508. (9 pgs.).
Petersen et al., "Upconverting Nanoparticle Security Inks Based on Hansen Solubility Parameters", Proc. IS&T's NIP 29 International Conference on Digital Printing Technologies, pp. 383-385 (2014). (3 pgs.).
Photoshop Elements Help—Patterns, Web Archive, Mar. 13, 2014. 2 pages.
Preston, et al, Enabling hand-crafted visual markers at scale, Proceedings of the 2017 ACM Conference on Designing Interactive Systems, Jun. 10, 2017, pp. 1227-1237.
Puyang, et al, Style Transferring Based Data Hiding for Color Images, International Conference on Cloud Computing and Security, Jun. 8, 2018, pp. 440-449.
R. Steiger et al., "Photochemical Studies on the Lightfastness of Ink-Jet Systems," Proc. IS&T's NIP 14 conference, pp. 114-117 (1998). (4 pgs.).
Raval, excerpts from github web site, Style Transfer Using VGG-16 Model, Mar. 8, 2017. 15 pages.
Rongen et al., 'Digital Image Watermarking by Salient Point Modification Practical Results,' Proc. SPIE vol. 3657: Security and Watermarking of Multimedia Contents, Jan. 1999, pp. 273-282.
Rosebrock, excerpts from web page Neural Style Transfer with OpenCV, Aug. 27, 2018. 23 pages.
Secord, Weighted Voronoi Stippling, Proceedings of ACM 2nd International Symposium on Non-Photorealistic Animation and Rendering, pp. 37-43, 2002.
Simonyan et al, Very Deep Convolutional Networks for Large-Scale Image Recognition, arXiv preprint 1409.1556v6, Apr. 10, 2015. 14 pages.
Ulyanov, et al, Improved texture networks: Maximizing quality and diversity in feed-forward stylization and texture synthesis, Proc. 2017 IEEE Conference on Computer Vision and Pattern Recognition, pp. 6924-6932.
Yang, et al, ARTcode: Preserve art and code in any image, Proc. 2016 ACM International Joint Conference on Pervasive and Ubiquitous Computing, pp. 904-915.
Yousaf et al.; Formulation of an Invisible Infrared Printing Ink, Dyes and Pigments, vol. 27, No. 4, 1995, pp. 297-303. (7 pgs.).

\* cited by examiner

GENERATING ARTISTIC DESIGNS ENCODED WITH ROBUST, MACHINE-READABLE DATA

TECHNICAL FIELD

This application claims benefit of U.S. Patent Application 62/582,871, filed Nov. 7, 2017. The invention relates to generation of artwork bearing optical codes, and complementary robustness measurement and reader technology for reliably reading the optical codes from degraded images of this artwork on objects.

BACKGROUND AND SUMMARY

Optical codes such as well-known one and two-dimensional barcodes are ubiquitous and critical in a wide variety of automatic data capture applications. Indeed, barcodes are so widespread, it is now typical to see a variety of barcode types on a single object to carry different types of data or to improve readability by redundantly encoding the same data on different parts of the object.

This growing use of barcodes poses a number of challenges for designers. First, each barcode must occupy a distinct space to ensure that it can be read reliably. This takes up valuable space that may be used for more important information, such as product information and artistic design elements that enhance the value and attractiveness of the object to users. Second, it creates a potential for confusion and complexity in image processing for image-based scanners, which are rapidly replacing laser scanners. While laser scanners can be directed at particular barcodes, one at a time, image-based scanners capture image frames that may contain part or all of one or more of the optical codes. Third, in an effort to reduce the visual impact of these codes, they are reduced in size and confined to a difficult to find location on the object. This makes them less reliable and harder for users and machine vision equipment to locate and read reliably.

Other types of optical codes, such as robust digital watermarks, provide an alternative to conventional barcodes that addresses these challenges in various ways. Digital watermarks may be hidden within other images on the object, and thus, not occupy valuable space. They also may be redundantly encoded over the object surface to improve the ease of locating and reliably reading the digital data codes they carry (referred to as the payload). This simplifies the user's task of imaging the object to obtain image frames from which the watermark reader reliably decodes the payload. It also improves computational efficiency and reliability of automatic data capture in a variety of usage scenarios. It does so because it facilitates reliable data capture from arbitrary and partial views of the object.

While digital watermarks provide these enhancements, there are important applications where there is a need for improved optical data carrying capability that meets aesthetic, robustness, and data capacity requirements. Aesthetic requirements encompass both macroscopic and microscopic visibility.

Macroscopic visibility refers to the impact of the optical data coding on visual quality from the perspective of the human visual system (HVS). For some data coding methods, this visibility may be measured objectively by measuring changes to an image to encode the data and determining impact to a human viewer of those changes from an HVS model. Such models include models that assess visibility of color changes. Visibility can be minimized by selection of colors and limitation on changes of these colors based on sensitivity of the HVS to those colors. HVS models also include those that measure contrast and provide a control signal that is a function of human's sensitivity to contrast as a function of spatial frequency, e.g., contrast sensitivity functions. The changes to encode data are adapted based on contrast sensitivity, applying increased signal where the HVS is less sensitive to contrast due to the signal. The host image can also be used to mask the presence of the data signal to the HVS. The host image can also be used to determine regions where the host image content masks the presence of the data signal from the HVS. The data signal can be encoded at increased strength in these regions.

Microscopic visibility refers to the perceived microscopic quality of press artwork when examined with a magnifying device, such as a loupe. This is important for high quality printing on objects of higher value. Though changes at the microscopic level are not visible to the average human viewer, designers demand that their designs are faithfully re-produced by the press. Further, from an authentication perspective, object authenticity is assessed by detecting changes to a design at a microscopic level. Microscopic visibility is typically judged aesthetically (i.e., subjectively), although HVS models could be adapted to provide objective measures by accounting for the "viewing distance".

Advanced digital watermark techniques adapt to the HVS, but there are limitations. Some artwork is not amenable to hiding or masking the data signal. In some designs, there is little image content available to mask the data signal. Even if the data signal satisfies macroscopic visibility constraints, it may not satisfy microscopic visibility constraints.

Robustness refers to the capability of the optical code to remain reliably readable despite various distortions that degrade the signal. For many types of artwork, it is difficult to meet this requirement while still satisfying aesthetic and data capacity requirements. Even if these requirements can be met within macroscopic visibility constraints, it is difficult to meet them without creating artifacts at the microscopic visibility level.

A significant aspect of robustness of an optical code is the ability to read it despite significant geometric distortion. Such distortion is common when the code is imaged from a camera or like 2D image sensor array at angles that apply a perspective or projective transform of the data signal. To compensate for this geometric distortion, the optical data carrier needs to devote additional signal structure. This structure tends to undermine aesthetics and data carrying capacity for variable digital data (e.g., the payload capacity).

Data capacity refers to the amount of data carried per unit area of the host artwork. As one attempts to put more data (e.g., more bits of payload) in a particular unit area, the ability to recover all of this data reliably decreases.

One way to address these challenges is to develop artwork that inherently carries digital data. This is difficult to achieve because the requirements contradict each other. Graphic designers like to use vector art that appears free of variations that are conducive for carrying robust data signals. In particular, the graphic elements of vector art, upon close examination, should have smooth contours and have clean areas between graphic shapes. These design objectives limit the use of data signals that would introduce microscopic changes to the contour of graphic shapes.

In one aspect of the invention, artwork carrying machine readable data is generated by editing artwork according to a data signal. The machine-readable data signal is generated from a digital payload and converted into an image tile. Artwork is edited according to the image tile by placing or moving graphic elements, adapting intersections of lines, or altering line density, among other techniques. In some embodiments, these operations are performed using a skeletal representation of the artwork, such as a medial axis transform.

In another aspect of the invention, artwork is generated from the data signal by skeletonizing it and applying morphological operators to a skeletal representation, such as a medial axis transform. Artistic effects are introduced by filtering the data signal with directional blurring or shape filters. Morphological operators are applied to the data signal to achieve desired aesthetic effects, while maintaining data signal robustness.

Another inventive aspect is the use of robustness measures to evaluate the data signal in the artwork and identify areas where the data signal needs to be updated to satisfy robustness constraints. Robustness measures are computed based on detection metrics for components of the signal, such as a reference signal, or payload signal components. In areas where the robustness metrics are below thresholds, artwork parameters are adapted, or new artwork is generated with alternative parameters, so that the data signal satisfies robustness constraints.

Another inventive aspect is the prioritizing of signal components of the data signal. In one embodiment, components are weighted according to a priority that achieves robustness constraints. Components are prioritized by modeling the data signal with components set to different priorities and measuring robustness metrics over a variety of distortions, including geometric distortion and simulation of scanner noise.

Additional inventive features are described in the following detailed description and the claims.

DETAILED DESCRIPTION

There are two approaches for generating artwork bearing a robust data signal. In a first approach, a candidate artwork design is edited to incorporate a data signal (e.g., FIG. 1). In a second approach (FIG. 2), the data signal is transformed into a desired artwork design.

Figure 1:
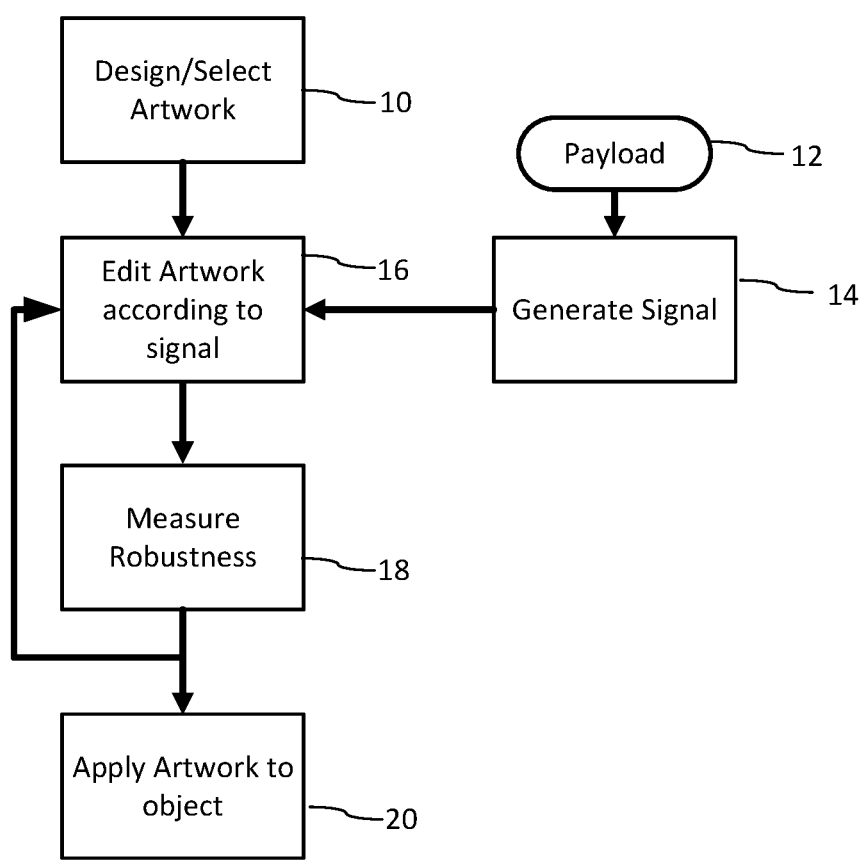
FIG. 1 is a diagram illustrating a method for generating artwork carrying a data signal, in which artwork is adapted to carry the data signal.

FIG. 1 is a diagram illustrating a method for generating artwork carrying a data signal, in which artwork is adapted to carry the data signal. In this approach, the designer creates a candidate artwork design or selects one from a library of designs (10). Vector art in the form of lines or small, discrete print structures of desired shape work well in this approach. A payload 12 is input to a signal generator 14, which generates a raw data signal in the form of two-dimensional tile of data signal elements. The method then edits the artwork at spatial locations according to the data signal elements at those locations (16). The method then measures the robustness of the data signal per unit area in the edited artwork (18). The level of robustness of the data signal in the artwork is controlled according to the number of edits allowed to the artwork in the space of a tile. Through an automated routine, or through designer control, the method iterates on the number and location of edits until desired aesthetic quality of design and robustness are achieved.

This process is repeated to generate artwork in which contiguous tiles of data signal are incorporated. The tiles span a spatial extent corresponding to a surface of an object to be encoded with the data signal.

When artwork with desired aesthetic quality and robustness is produced, it is applied to an object (20). Artwork is converted to a form compatible with the marking technology used to apply it to an object (e.g., a substrate). For printing technology, this process entails imaging the artwork to a form in which the press applies it to a print substrate. This involves rasterizing the vector art and converting it to physical form in a press which applies ink to a substrate (e.g., offset, gravure, intaglio, flexographic, ink jet, thermal, etc.). The artwork is applied in a color separation, which corresponds to ink applied by the press to the substrate. The graphical elements of the artwork are printed with that ink, whereas open space around the location of graphical elements contain no ink, or at least ink that maintains desired contrast relative to the graphical elements with respect to the spectral bands in which a compatible data reader captures an image of the artwork. Components of the artwork may be conveyed in different color separations, e.g., foreground elements in one color ink and background in another. For laser marking technology, this process entails creating a vector or rasterized form of the artwork compatible with the laser marking technology. The laser marking technology applies the artwork to a substrate.

Figure 2:
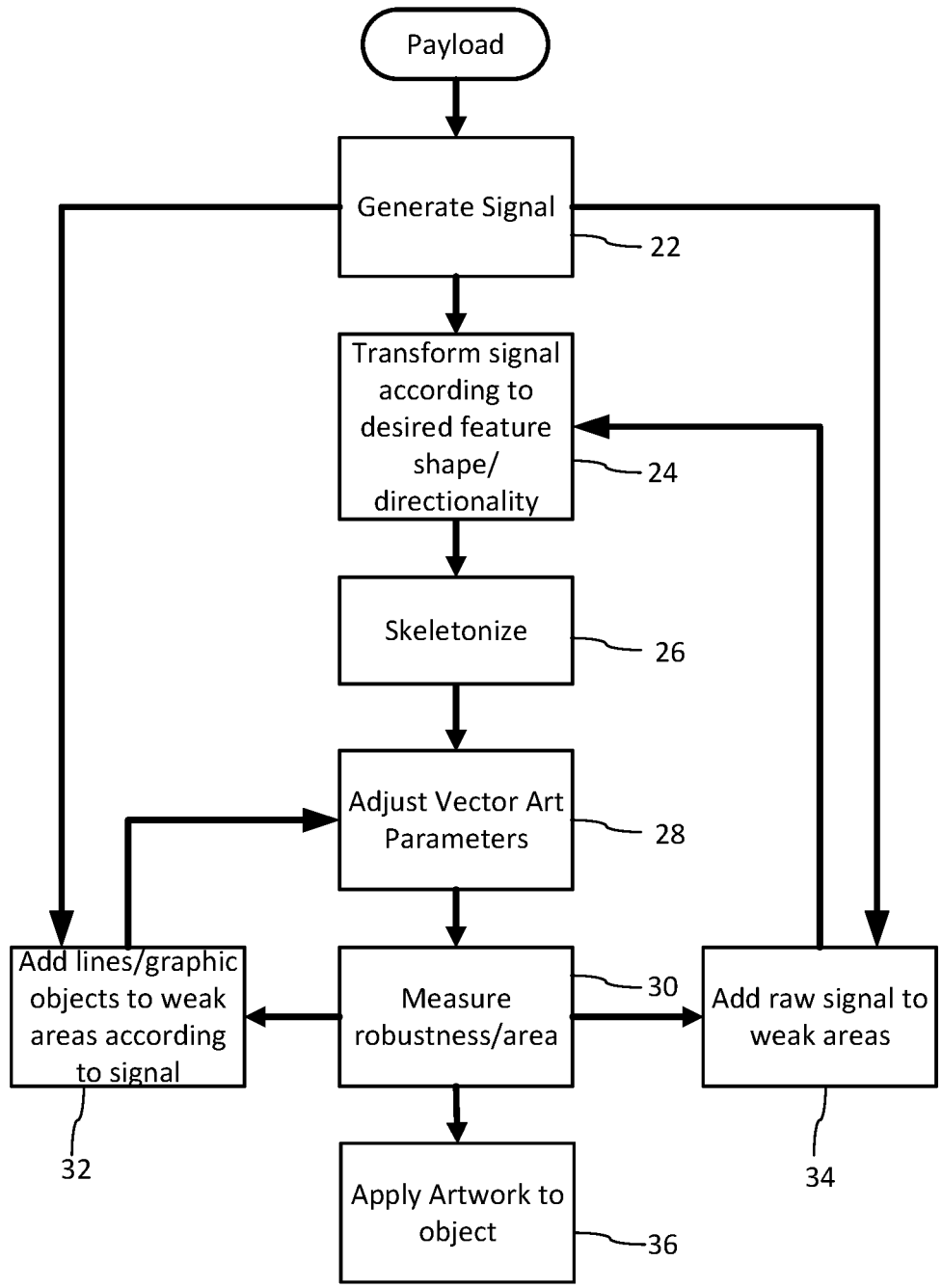
FIG. 2 is a diagram illustrating a method for generating artwork carrying a data signal, in which the data signal is adapted to a target artwork design.

FIG. 2 is a diagram illustrating a method for generating artwork carrying a data signal, in which the data signal is adapted to a target artwork design. In this approach, the method generates a raw data signal, in a similar fashion as in FIG. 1 (22). The designer creates desired artwork by specifying parameters of the transformations to the raw data signal. One set of parameters controls an initial transformation (24) in which a filter applied to the data signal elements within a tile transforms the data signal elements in a direction to influence the formation of a desired graphic structure. For example, a blur filter is applied to locations of the raw signal according to desired directionality. This forms the data elements into graphical elements biased toward a shape of the filter applied. The directionality of the filter is set in spatial areas to influence the shape of the graphical elements in those areas. This is accomplished by choosing a filter kernel with desired shape and directionality or adapting the parameters of a filter kernel to create the same effect. The result is a data signal transformed into graphic elements in a tile having directionality and shape. For example, the graphical elements are oriented in directions by filters for spatial areas to form shapes, e.g., with diagonal, circular, or wavy orientation of the graphical elements. Next, the method skeletonizes the filtered data signal (26). This produces a skeletal representation, which enables further refinement of the graphical elements in the design. In the next step (28), the parameters of the vector art are adjusted to refine the aesthetic properties of the graphical elements, which are now transformed into vector artwork. These include morphological operators on the skeletal representation such as dilation, erosion, smoothing of contours, and softening or sharpening corners. Next, the method measures the robustness of the data signal per unit area to determine whether there are any areas where the data signal falls below a desired robustness level (30). This process produces a spatial map of signal robustness indicating robustness per sub-region within a tile.

For sub-region areas where the data signal is too weak, there are options for incorporating data signal in those areas. In one option (32), the method adds lines or graphic objects according to the raw data signal. The raw data signal indicates where lines or graphic objects are to be placed to correspond to the data signal. The vector art parameters of these graphical structures are adjusted to refine their aesthetic properties (28). In another option (34), the method inserts raw data signal in identified weak areas, and the raw signal is transformed again to generate new graphic structure for these weak signal areas.

When artwork with desired aesthetic quality and robustness is produced, it is applied to an object (34) in a similar process as described for FIG. 1.

Figure 3:
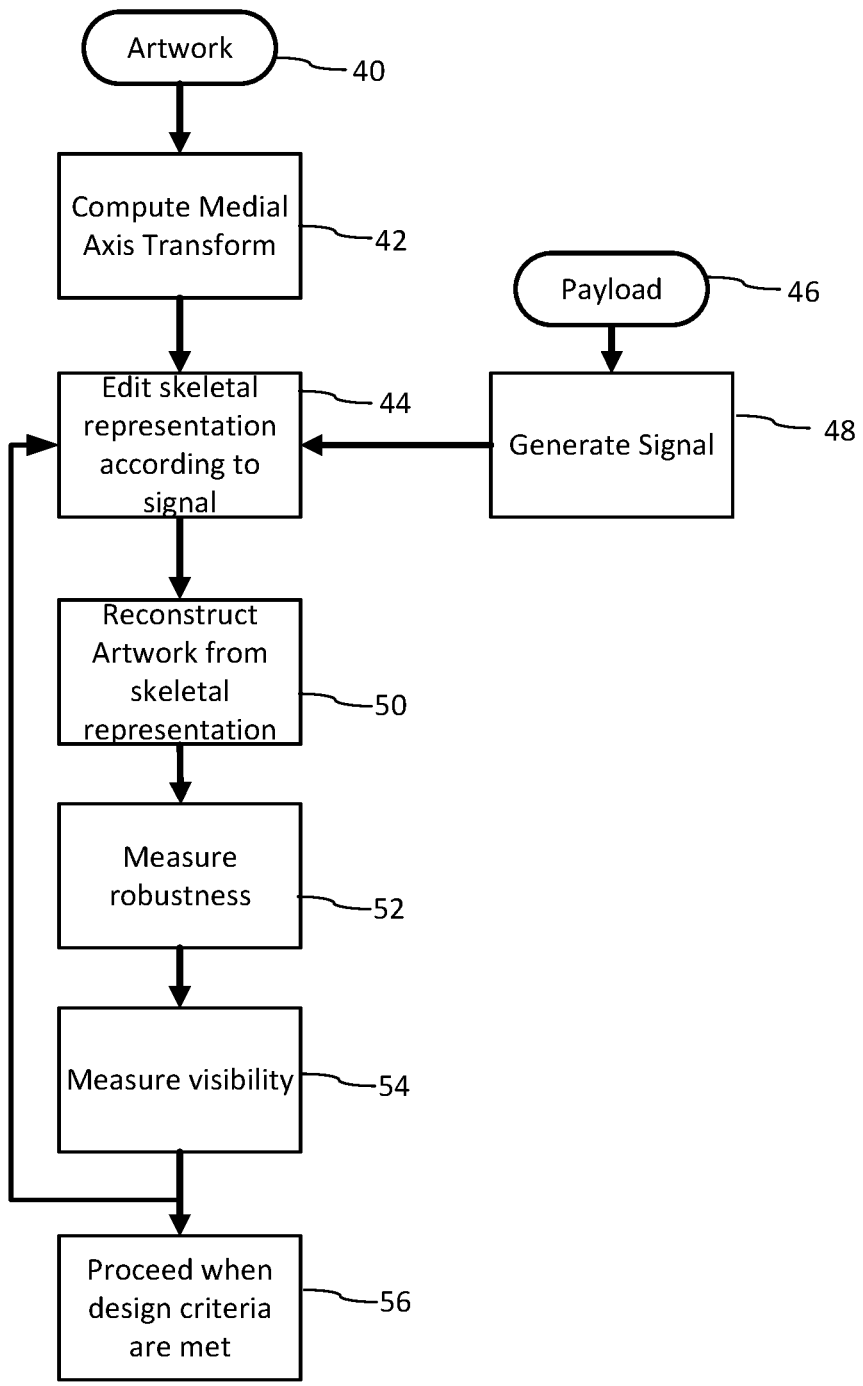
FIG. 3 is a diagram of a method for adapting artwork design to carry a data signal.

FIG. 3 is a diagram of a method for adapting artwork design to carry a data signal. This diagram depicts an embodiment of the approach of FIG. 1. In this method, the designer selects artwork 40 from a library or creates it with a graphic design application. The method then skeletonizes the artwork by computing a medial axis transform (MAT) of it (42). The MAT converts the shape of a graphical element into a skeletal structure of lines and circles. The circles are centered along the lines (the medial axis) and are tangent with the outer surface of the graphical element. For a polygon, the medial axis is a tree whose leaves are the vertices of the polygon, and whose edges are either straight segments or arcs. The MAT is comprised of the medial axis and the radius function of the maximally inscribed discs. The MAT representation of the artwork is comprised of the lines and circle descriptions for all of the graphical elements, along with the location of these elements in the artwork. This places the artwork in a convenient form to edit the skeletal representation at spatial locations within the artwork according to the data signal.

Next, the method edits the resulting skeletal representation according to the signal. These edits include move, insert or delete skeleton structure to correspond to the raw data signal. The method traverses spatial locations of the artwork and edits the spatial locations according to the raw data signal elements mapped to those location.

The raw data signal is generated from a digital data payload 46 and forms an array of data signal elements in a tile (48). The artwork is subdivided into contiguous blocks corresponding to tiles. The process of editing (44) applies the data signal element to a corresponding location in the artwork to control the editing operation. In one form of editing, a graphical element at a location in the skeletal representation is moved to form a gradient consistent with the signal gradient of the data signal elements around that location. In another form of editing, a graphical element is removed to correspond to the value of data signal elements around that location indicating where signal is present and absent. In another form of editing, a graphical element is inserted into the skeletal representation to correspond to the data signal elements around that location indicating where the signal is present and absent. Specific examples of these edits are detailed further below.

In each of these edits, the local artwork structures around a data signal element are designed to be consistent with the data signal structure. This enhances robust detection in the reader. The reader applies a filter to extract an estimate for a data signal value from the structure at a location. Thus, to the extent that the structure of the artwork conforms to the data signal, the filter in the reader will accurately estimate the data signal element. For example, where the data signal is conveyed in luminance change at location relative neighboring locations, the graphical element is moved, added or removed to make the artwork have a greater or lower luminance value corresponding to the data signal at that location relative to the neighboring locations. Similar edits apply where data signal is conveyed in another optical channel, such as a chrominance direction.

After making at least an initial pass of edits across the data signal locations in the artwork, the method reconstructs an image representation from the skeletal representation (50). This process converts the skeletal representation into a form in which the robustness of the data signal can be measured (e.g., a rasterized image).

The method then traverses spatial blocks of the image, and for each, computes a robustness metric (52). The robustness metric indicates the extent to which the data signal is detectable in the spatial block at that block location. It is comprised of one or more detection metrics computed for each spatial block. The spatial block locations may be overlapped or contiguous, and sized to correspond to a tile, or sub-region of a tile. One detection metric is correlation with a reference signal that forms part of the data signal. This reference signal may be a synchronization signal, fixed portion of the payload signal, or hybrid of the two. Another detection metric is a measure of correlation between a reconstructed variable payload signal known to be encoded at locations within a tile with the estimate of that signal extracted from its locations in the artwork. We refer to this signal as "reconstructed" because it corresponds to the error correction coded signal at the locations that is generated by taking the variable bits that map to those locations and reconstructing the data signal from them. An aggregate robustness metric of a block is produced by multiplying the detection probability derived from each detection metric. The robustness metrics for each block form a spatial map of robustness metrics for the artwork. This map may be color coded as a function of the detection probability and displayed to the designer to reveal weak signal areas (areas with detection probability below a threshold). It may also be used programmatically to locate areas where a more reliable data signal needs to be inserted. For more background on computing robustness metrics and a spatial map of them, please see U.S. Pat. No. 9,690,967, which is hereby incorporate by reference.

Next, in some embodiments, the method also computes an objective visibility metric for spatial locations across the artwork. This process applies for data modulation methods in which artwork is not moved, but instead, is edited in place. Objective visibility is measured based on the contrast sensitivity function of pixel changes across an image. In this objective visibility measurement, the visibility program determines the pixel changes by comparing an image before and after editing to encode the data signal, and then applying the contrast sensitivity function to produce a visibility metric that approximates visibility of the changes to the HVS. If graphic elements are moved rather than changed in place, the objective visibility computed by this measure is misleadingly high. The goal is to integrate the data signal in the art as a texture that is aesthetically compatible with the texture of the artwork design. Where the data signal is integrated by moving or positioning graphical elements in an artistic design, the artwork conveys the data signal with no objective or subjective visibility since there is no before/after comparison. For more on automated visibility methods, please see U.S. Pat. Nos. 9,565,335 and 9,380,186, which are hereby incorporated by reference.

These patent documents also describe visibility models that take into account color differences. For data encoding methods that edit by removing structure, the visibility of the removal may be masked by filling the gap with an alternate color that reduces the visible difference to human viewers, yet does not degrade the robustness. This is achieved by selecting color pairs for the graphical element and inserted gap, respectively, with small visible difference, yet having detectable difference to the reader. The difference is detectable to the reader because it captures an image with a combination of illumination and image sensor that captures pixels of a spectral band in which the spectral differences between the colors is great enough to detect data signal modulation.

In the case where the robustness or visibility measures are not acceptable, the method iterates through the method to generate artwork with improved measures. This is achieved in this embodiment by controlling the number of edits allowed. In particular, the number of edits may be gradually increased in locations where the robustness metric indicates weak signal, until the robustness metric is met.

Figure 4:
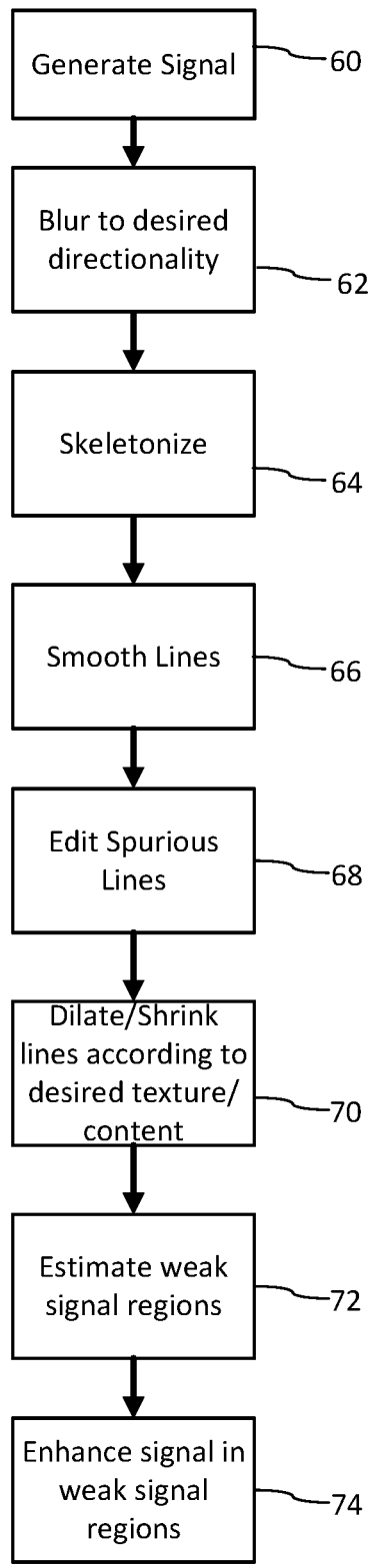
FIG. 4 is a diagram of method for adapting a data signal to a target artwork design.

FIG. 4 is a diagram of method for adapting a data signal to a target artwork design. This approach is related to the one depicted in FIG. 2, and elaborates on image processing functions of blocks 24, 26 and 28). In this embodiment, the method begins with a process of generating a raw data signal in the form of a tile 60. The tile is a rectangular array of data signal elements, which is in the form of a multi-level per pixel image. The method applies a blur function according to desired directionality (62). The directionality is achieved using a motion blur in a desired direction or using a shape blur. A Guassian blur may also be used to blur the data signal elements in multiple directions. The contrast of the raw data signal may be enhanced prior to application of the blur function (e.g., using the exposure tool in the image editing program Adobe PhotoShop from Adobe Systems, Inc.). This contrast enhancement can be used to accentuate the peaks and valleys within the image of the data signal tile.

Next, the method skeletonizes the blurred data signal 64. The blurred data signal is thresholded, which converts it to a bi-level image by setting pixels lighter than a threshold to white and all darker pixels to black. The resulting thresholded image is then skeletonized (64). This may be accomplished by applying a MAT. The image trace function in the image editing program Adobe Illustrator from Adobe Systems, Inc. may be used as well.

Next, the method smoothes lines (66), edits spurious lines not consistent with desired texture 68, and dilates or shrinks lines according to the desired aesthetics of the artwork (70). These operations may be executed using the image trace function in Adobe Illustrator by setting desired parameters of stroke width and corner sharpness. Next, the method applies a robustness measure to compute a robustness map for the resulting artwork (72). This is achieved as explained above in connection with FIGS. 2 and 3 (FIG. 2, block 30, FIG. 3, block 52). As explained, the method may be repeated for weak signal regions identified in each pass until the desired robustness is achieved across the artwork.

Raw Signal Generator

Figure 5:
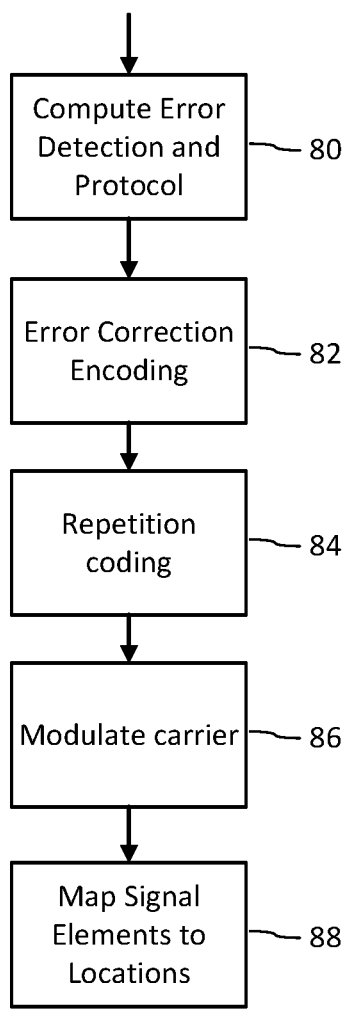
FIG. 5 is a diagram of a method of generating a raw data signal.

FIG. 5 is a flow diagram illustrating operations of a signal generator. This signal generator may used to generate raw data signal tiles. Each of the blocks in the diagram depict processing modules that transform the input payload data into a data signal structure. For a given data signal protocol, each block provides one or more processing stage options selected according to the protocol. In processing module 80, the data payload is processed to compute error detection bits, e.g., such as a Cyclic Redundancy Check, Parity, check sum or like error detection message symbols. Additional fixed and variable messages used in identifying the protocol and facilitating detection, such as synchronization signals may be added at this stage or subsequent stages.

Error correction encoding module 82 transforms the message symbols into an array of encoded message elements (e.g., binary or M-ary elements) using an error correction method. Examples include block codes, BCH, Reed Solomon, convolutional codes, turbo codes, etc.

Repetition encoding module 84 repeats the string of symbols from the prior stage to improve robustness. Repetition encoding may be removed and replaced entirely with error correction coding. For example, rather than applying convolutional encoding (e.g., at ⅓ rate) followed by repetition (repeat three times), these two can be replaced by convolution encoding to produce a coded payload with approximately the same length.

Next, carrier modulation module 86 takes message elements of the previous stage and modulates them onto corresponding carrier signals. For example, a carrier might be an array of pseudorandom signal elements, with equal number of positive and negative elements (e.g., 16, 32, 64 elements), or other waveform. In the case of positive and negative elements, the payload signal is form of binary antipodal signal. It also may be formed into a ternary (of 3 levels, −1, 0, 1) or M-ary signal (of M levels).

Mapping module 88 maps signal elements of each modulated carrier signal to locations. These may be spatial locations with a tile. They may also be spatial frequency locations. In this case, the signal elements are used to modulate frequency domain values (such as magnitude or phase). The resulting frequency domain values are inverse transformed into the spatial domain to create a raw data signal tile in the spatial domain. In the approach of FIG. 1, the locations correspond to locations within the artwork design.

Mapping module 88 also maps a synchronization signal to locations. These locations may overlap or not the locations of the payload. The encoded payload and synchronization signal are signal components are weighted and together, form the raw data signal of a tile.

To accurately recover the payload, the reader must be able to extract estimates of the coded data signal at their locations within a tile. This requires the reader to synchronize the image under analysis to determine the tile locations, and data element locations within the tiles. The locations are arranged in two dimensional blocks forming each tile. The synchronizer determines rotation, scale and translation (origin) of each tile.

The data signal comprises an explicit and/or implicit synchronization signal. An explicit synchronization signal is a signal component separate from the encoded payload that is included with the encoded payload, e.g., within the same tile. An implicit synchronization signal is a signal formed with the encoded payload, giving it structure that facilitates geometric synchronization. Examples of explicit and implicit synchronization signals are provided in our U.S. Pat. Nos. 6,614,914, and 5,862,260.

In particular, one example of an explicit synchronization signal is a signal comprised of a set of sine waves, with pseudo-random phase, which appear as peaks in the Fourier domain of the suspect signal. See, e.g., U.S. Pat. Nos. 6,614,914, and 5,862,260, describing use of a synchronization signal in conjunction with a robust data signal. Also see U.S. Pat. No. 7,986,807, which is hereby incorporated by reference.

Our US Publications 20120078989 and 20170193628, which is hereby incorporated by reference, provide additional methods for detecting a reference signal with this type of structure and recovering rotation, scale and translation. US 20170193628 provides additional teaching of synchronizing a reader and extracting a digital payload with detection filters, even where there is perspective distortion.

Examples of implicit synchronization signals, and their use, are provided in U.S. Pat. Nos. 6,614,914, 5,862,260, 6,625,297, 7,072,490, and 9,747,656, which are hereby incorporated by reference.

Prioritizing of Data Signal Components

The generation of artwork from the raw data signal results in loss of data signal. This occurs because the transformations remove or distort portions of a dense data signal tile. For instance, as sparsity of graphical elements increases with thresholding, skeletonizing, and editing the skeletal representation, data signal elements are removed or altered, which reduces robustness. This reduces the capacity of the data channel in a given tile region of the artwork. In some cases, there can be contention between allocation of the remaining data channel to components of the data signal, such as the synchronization and payload components. In our U.S. Pat. No. 9,635,378, we discuss ways to allocate a sparse data channel to components of a data signal, including synchronization and payload components. Please see U.S. Pat. No. 9,635,378, which is hereby incorporated by reference. These methods of generating a sparse data signal may be used in the above techniques in which graphical objects are positioned at the location of sparse signal within a tile.

Incorporating the data signal into artwork also impacts the prioritization of signal components in the data channel of the artwork. This occurs because the artwork can interfere differently with the signal components. In addition, the amount of signal capacity dedicated to synchronization and payload to achieve reliable detection varies with the artwork design. Thus, the ratio of the signal components should be adapted for the artwork.

Figure 6:
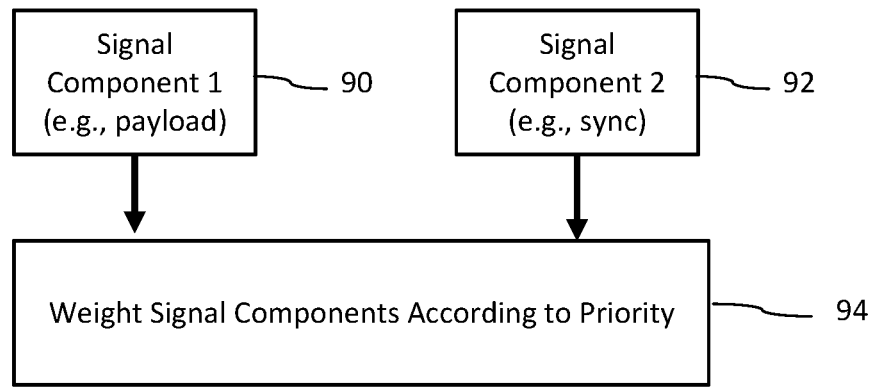
FIG. 6 is a diagram illustrating a method of weighting elements of a data signal for use in generating artwork that optimally carries the data signal.

Here we discuss strategies for prioritizing signal components to counteract loss of robustness. FIG. 6 is a diagram illustrating a method of weighting elements of a data signal prior to use in generating artwork that optimally carries the data signal. The signal generator produces signal components. These include components that carry a subset of the payload bits (90) and components that provide synchronization (92). In block 94, the signal generator weights the components according to their priority. This priority is then used in the artwork generation to control which of the data signal elements are retained.

In one approach for adapting artwork to carry signal, the above process for editing the artwork is executed with different weightings for the payload and synchronization components for a candidate artwork design and editing strategy. This yields several variants of the artwork carrying the data signal. Additional permutations of each variant are then generated by distorting the artwork according to image shifts, rotation angles, reducing and enlarging spatial scale, noise addition and blur. Robustness measures based on both correlation with a reference signal for synchronization and correlation with the message signal are computed and stored for each artwork variant. Additionally, the reader is executed on each variant to determine whether it successfully decodes the payload. The component weighting and robustness metric thresholds are then derived by analyzing the distribution of ratio of components that lead to successful payload decoding. The distribution illustrates which ratios and robustness metric values are required to lead to reliable detection. These ratios and robustness metrics are then used for the candidate artwork design and signal encoding method in an automated data encoding program.

Another approach optimizes the data signal in sparse artwork. To be compatible with sparse artwork, the data signal is also sparse, and is structured to be consistent with the sparse artwork. Sparse data signals can be binary (0,1), trinary (−1,0,1), or other coarse quantization. Sparse signals are assumed to be low density, i.e., less than 50% ink or less than 50% space. Since the signal has maximum robustness at 50%, any optimal sparse algorithm should increase in robustness as the ink/space density tends toward 50% Sparse signals maintain robustness by using thresholds to create binary or trinary signals. These binary or trinary signals ensure that the detection filter will return a maximum value at desired signal locations. Between the sparse locations in the artwork, the detection filter will output a Gaussian distribution between maximum negative and positive outputs due to random noise introduced by the image capture (namely, scanner or camera noise). The Gauss width depends on the amount of blur included in the image capture processing.

During optimization of sparse signals, a small amount of filtered noise is added to account for the fact that the detection filter will create non-zero values everywhere due to noise of the image capture device. The optimization parameters for sparse signals include synchronization signal to payload signal weighting and thresholds. There is a single threshold for binary signals. It is a negative threshold for low ink density, <50%, and a positive threshold for high ink density, >50%. There is a dual positive and negative threshold for trinary signals. The robustness objective is the same for dense and sparse signals. Namely, it is a detection robustness over the targeted workflow environment, which is modeled with distortions to the encoded artwork.

Data Signal Mapping

Figure 7:
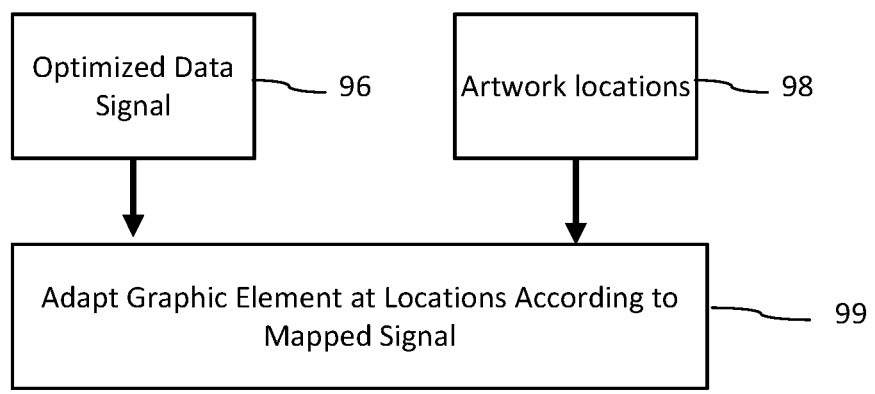
FIG. 7 is a diagram illustrating a method of mapping data signal elements to locations within artwork.

FIG. 7 is a diagram illustrating a method of mapping data signal elements to locations within artwork. In this embodiment, the optimized data signal components 96 from the above signal generation are mapped to artwork locations 99. In processing module 99, graphic elements are generated and/or adapted at the artwork locations.

Applying the method of FIG. 5, the payload is formatted into a binary sequence, which is encoded and mapped to the locations of a tile. For illustration, we describe an implementation of an N by M array of bit cells. The parameters, N and M are integers, and the tile is comprised of an N by M array of bit cells. The size of the tile is configurable and depends on application requirements, such as payload capacity per unit area, robustness, and visibility. Payload capacity increases per unit area with the increase in bit cells per unit area. This additional capacity may be used to improve robustness by redundantly encoding the payload in plural bit cells. Visibility tends to decrease with higher spatial resolution (higher spatial density of bit cells), as the HVS is less sensitive to changes at higher spatial frequencies. Examples of bit cell array sizes include 64 by 64, 128 by 128, 256 by 256 and 512 by 512. While each of these is square and has a dimension that is power of 2, the tile need not be so limited. The bit cells correspond to spatial locations within a tile. In particular, the spatial locations correspond to pixel samples at a configurable spatial resolution, such as 75-600 DPI. The payload is repeated in contiguous tiles of artwork. An instance of the payload is encoded in each tile, occupying a block of artwork having a size that depends on the number of bit cells per tile and the spatial resolution. The tile is redundantly encoded in several contiguous tiles, providing added robustness, as the detector accumulates signal estimates for a payload across tiles. Additionally, the entire payload may be extracted from a portion of a tile in configurations where it is redundantly encoded in sub-tile regions.

A few examples will help illustrate the parameters of a tile. The spatial resolution of the bit cells in a tile may be expressed in terms of cells per inch (CPI). This notation provides a convenient way to relate the bit cells spatially to pixels in an image, which are typically expressed in terms of dots per inch (DPI). Take for example a bit cell resolution of 75 CPI. When a tile is encoded into an image with a pixel resolution of 300 DPI, each bit cell corresponds to a 4 by 4 array of pixels in the 300 DPI image. As another example, each bit cell at 150 CPI corresponds to a region of 2 by 2 pixels within a 300 DPI image and a region of 4 by 4 pixels within a 600 DPI image. Now, considering tile size in terms of N by M bit cells and setting the size of a bit cell, we can express the tile size by multiplying the bit cell dimension by the number of bit cells per horizontal and vertical dimension of the tile. Below is a table of examples of tile sizes in inches for different CPI and number of bit cells, N in one dimension. In this case, the tiles are square arrays of N by N bit cells.

| Examples of Tile Size for Different Cells Per Inch (CPI) | | | | | | |
|---|---|---|---|---|---|---|
| Tile Size (N) | 75 | 100 | 120 | 150 | 300 | 600 |
| 32 | 0.43 | 0.32 | 0.27 | 0.21 | 0.11 | 0.05 |
| 64 | 0.85 | 0.64 | 0.53 | 0.43 | 0.21 | 0.11 |
| 128 | 1.71 | 1.28 | 1.07 | 0.85 | 0.43 | 0.21 |

-continued

| Examples of Tile Size for Different Cells Per Inch (CPI) | | | | | | |
|---|---|---|---|---|---|---|
| Tile Size (N) | 75 | 100 | 120 | 150 | 300 | 600 |
| 256 | 3.41 | 2.56 | 2.13 | 1.71 | 0.85 | 0.43 |
| 512 | 6.83 | 5.12 | 4.27 | 3.41 | 1.71 | 0.85 |

These examples illustrate that the tile size varies with bit cells per tile and the spatial resolution of the bit cells. These are not intended to be limiting, as the developer may select the parameters for the tile based on the needs of the application, in terms of data capacity, robustness and visibility.

There are several alternatives for mapping functions to map the encoded payload to bit cell locations in the tile. In one approach, prioritized signal components from the above optimization process are mapped to locations within a tile. In another, they are mapped to bit cell patterns of differentially encoded bit cells as described in U.S. Pat. No. 9,747,656, incorporated above. In the latter, the tile size may be increased to accommodate the differential encoding of each encoded bit in a pattern of differential encoded bit cells, where the bit cells corresponding to embedding locations at a target resolution (e.g., 300 DPI).

For an explicit synchronization signal components, the mapping function maps a discrete digital image of the synchronization signal to the host image block. For example, where the synchronization signal comprises a set of Fourier magnitude peaks or sinusoids with pseudorandom phase, the synchronization signal is generated in the spatial domain in a block size coextensive with the tile. This signal component is weighted according to the priority relative to the payload component in the above-described optimization process.

Reading a Payload from Captured Images

Figure 8:
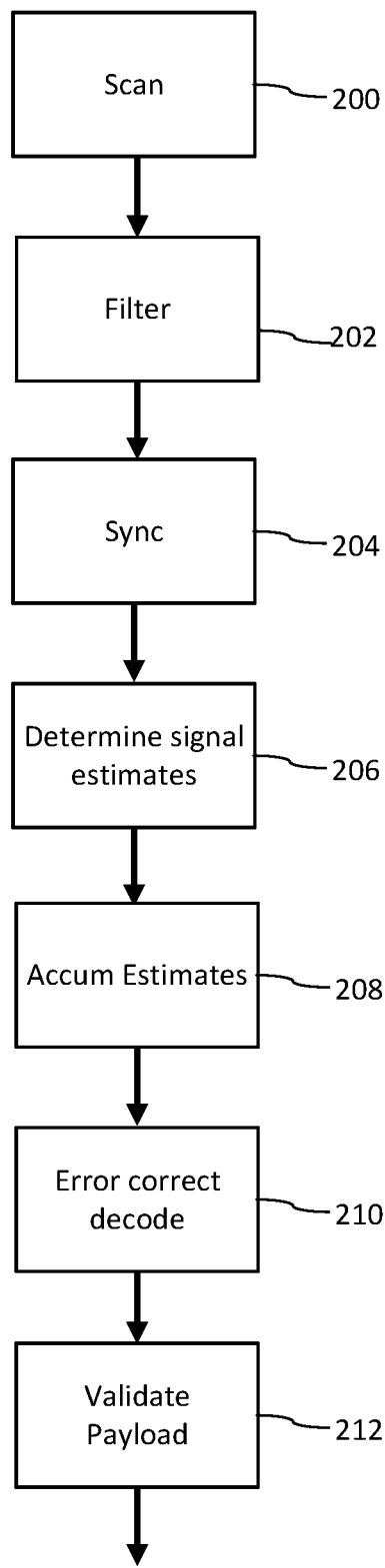
FIG. 8 is a diagram illustrating a method of reading a data signal from an image captured of an object from a digital camera or scanner.

FIG. 8 is a flow diagram illustrating a method for decoding a payload signal from an image signal captured from an object.

In an image capture process (e.g., scan 200 of FIG. 8), the image is captured at a resolution preferably near the resolution at which the data signal has been encoded within the original image (e.g., 300 DPI, 100 DPI, etc.). An image up-sampling or down-sampling operation may be performed to convert the image supplied by the digital camera or scanner to a target resolution for further decoding.

At least some number of tiles of encoded data signal are captured within the scan.

In the initial processing of the decoding method, it is advantageous to select frames and blocks within frames that have image content that are most likely to contain the encoded payload. The block size is selected to be large enough to span substantially all of a complete tile of encoded payload signal, and preferably a cluster of neighboring tiles. However, because the distance from the camera or scanner may vary, the spatial scale of the encoded signal is likely to vary from its scale at the time of encoding. This spatial scale distortion is further addressed in the synchronization process.

The first stage of the decoding process filters the incoming image signal to prepare it for detection and synchronization of the encoded signal (202). The decoding process subdivides the image into blocks and selects blocks for further decoding operations. A first filtering stage converts the input color image signal (e.g., RGB values) to a color channel or channels where the auxiliary signal has been encoded. See, e.g., 20100150434 for more on color channel encoding and decoding.

A second filtering operation isolates the data signal from the host image. Pre-filtering is adapted for the data signal encoding format, including the type of synchronization employed. For example, where an explicit synchronization signal is used, pre-filtering is adapted to isolate the explicit synchronization signal for the synchronization process.

In some embodiments, the synchronization signal is a collection of peaks in the Fourier domain. Prior to conversion to the Fourier domain, the image blocks are pre-filtered. See, e.g., LaPlacian pre-filter in U.S. Pat. No. 6,614,914. A window function is applied to the blocks and then a transform to the Fourier domain, applying an FFT. Another filtering operation is performed in the Fourier domain. See, e.g., pre-filtering options in U.S. Pat. Nos. 6,988,202, 6,614,914, 20120078989, which are hereby incorporated by reference.

For more on filters, also see U.S. Pat. No. 7,076,082, which is hereby incorporated by reference. This patent describes a multi-axis filter, e.g., an oct-axis filter. Oct axis compares a discrete image sample with eight neighbors to provide a compare value (e.g., +1 for positive difference, −1 or negative difference), and sums the compare values. Different arrangements of neighbors and weights may be applied to shape the filter according to different functions. Another filter variant is a cross shaped filter, in which a sample of interest is compared with an average of horizontal neighbors and vertical neighbors, which are then similarly summed.

Next, synchronization process (204) is executed on a filtered block to recover the rotation, spatial scale, and translation of the encoded signal tiles. This process may employ a log polar method as detailed in U.S. Pat. No. 6,614,914 or least squares approach of 20120078989 to recover rotation and scale of a synchronization signal comprised of peaks in the Fourier domain. To recover translation, the phase correlation method of U.S. Pat. No. 6,614,914 is used, or phase estimation and phase deviation methods of 20120078989 are used.

Alternative methods perform synchronization on an implicit synchronization signal, e.g., as detailed in U.S. Pat. No. 9,747,656.

Next, the decoder steps through the embedding locations in a tile, extracting bit estimates from each location (206). This process applies, for each location, the rotation, scale and translation parameters, to extract a bit estimate from each bit cell location (206). In particle, as it visits each bit cell location in a tile, it transforms it to a location in the received image based on the affine transform parameters derived in the synchronization, and then samples around each location. It does this process for the embedding location and its neighbors to feed inputs to a detection filter (e.g., oct axis or cross shaped). A bit estimate is extracted at each bit cell location using filtering operations, e.g., oct axis or cross shaped filter (see above), to compare a sample at embedding locations with neighbors. The output (e.g., 1, −1) of each compare operation is summed to provide an estimate for a bit cell location. Each bit estimate at a bit cell location corresponds to an element of a modulated carrier signal.

The signal decoder estimates a value of each error correction encoded bit by accumulating the bit estimates from the bit cell locations of the carrier signal for that bit (208). For instance, in the encoder embodiment above, error correction encoded bits are modulated over a corresponding carrier signal with 16 or 32 elements (e.g., multiplied by or XOR with a binary anti-podal signal). A bit value is demodulated from the estimates extracted from the corresponding bit cell locations of these elements. This demodulation operation multiplies the estimate by the carrier signal sign and adds the result. This demodulation provides a soft estimate for each error correction encoded bit.

These soft estimates are input to an error correction decoder to produce the payload signal (210). For a convolutional encoded payload, a Viterbi decoder is used to produce the payload signal, including the checksum or CRC. For other forms of error correction, a compatible decoder is applied to reconstruct the payload. Examples include block codes, BCH, Reed Solomon, Turbo codes.

Next, the payload is validated by computing the check sum and comparing with the decoded checksum bits (212). The check sum matches the one in the encoder, of course. For the example above, the reader computes a CRC for a portion of the payload and compares it with the CRC portion in the payload.

At this stage, the payload is now passed to other requesting processes, e.g., application programs or software routines that use its contents in subsequent processing.

Artwork Generation Embodiments

Figure 9:
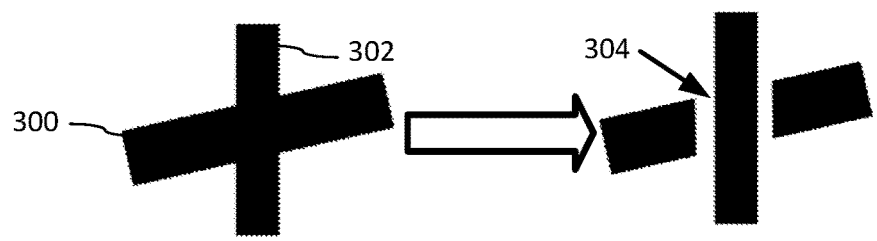
FIG. 9 is a diagram illustrating line weave modulation of a graphic element.

FIG. 9 is a diagram illustrating line weave modulation of a graphic element. In this type of modulation, a data signal element corresponding to a lighter image pixel relative to darker neighbor pixels is inserted by making a gap 304 between intersecting line elements 300, 302. This creates the contrast between neighboring bit cells to form a data signal element detectable by applying the detection filter at this location.

Figure 10:
FIG. 10 is a diagram depicting line continuity modulation.

FIG. 10 is a diagram depicting line continuity modulation. In this type of modulation, a data signal element corresponding to a lighter pixel is inserted by inserting a gap 314 in line segments 310, 312.

Figure 11:
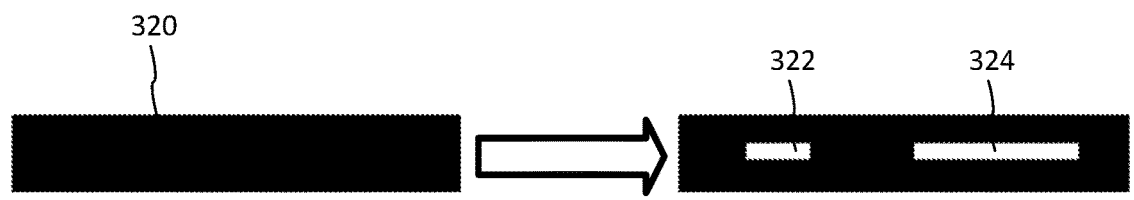
FIG. 11 is a diagram showing line density modulation.

FIG. 11 is a diagram showing line density modulation. In this type of modulation, a data signal element corresponding to a lighter pixel relative to neighboring darker pixels is inserted by decreasing density inside the contours of a line element 320. This varies the ink density with the line element. The encoder varies the density by hollowing lines with gaps 322, 324 at locations corresponding to lighter pixels in the data signal.

Figure 12:
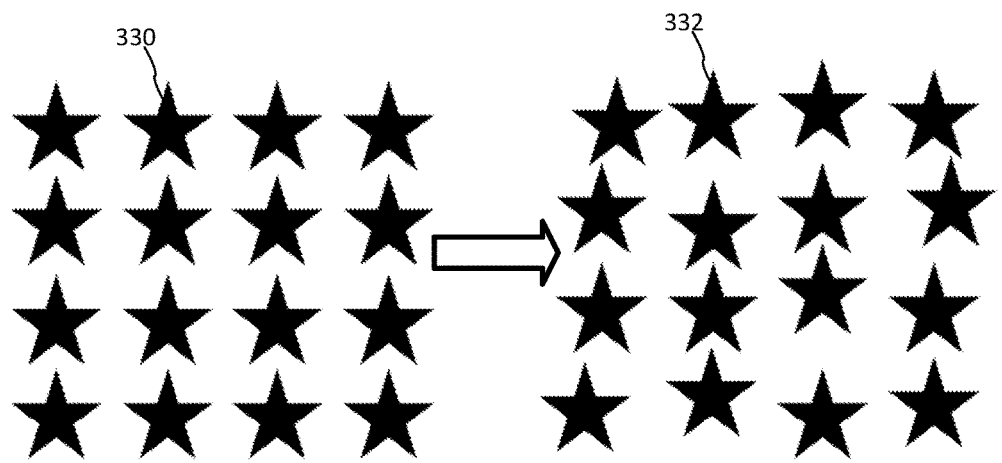
FIG. 12 is a diagram illustrating object position modulation.

FIG. 12 is a diagram illustrating object position modulation. In this type of modulation, the position of a graphical object 330 is moved to a new position 332 to be consistent with the signal gradient of the data signal elements at that object's location. In this example, the graphical objects 330 are repeated in horizontal and vertical directions. The encoder modulates their position according to the signal gradient (light to dark/dark to light) of the data signal element values at each bit cell location.

Figure 13:
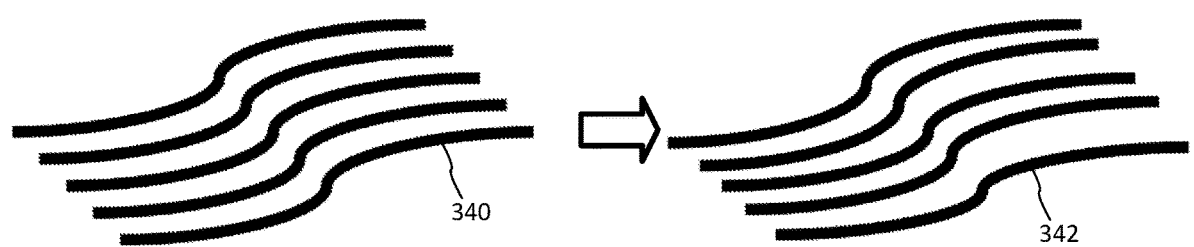
FIG. 13 is a diagram depicting line position modulation.

FIG. 13 is a diagram depicting line position modulation. In this type of modulation, the position of a line element 340 is moved to a new position 342 to be consistent with the signal gradient of the data signal elements at the location of the line element. This adjustment in the position of the line modulates the local ink density at a bit cell location such that it is higher or lower than its neighbors according to the signal gradient of the data signal at a bit cell location within a tile.

Figure 14:
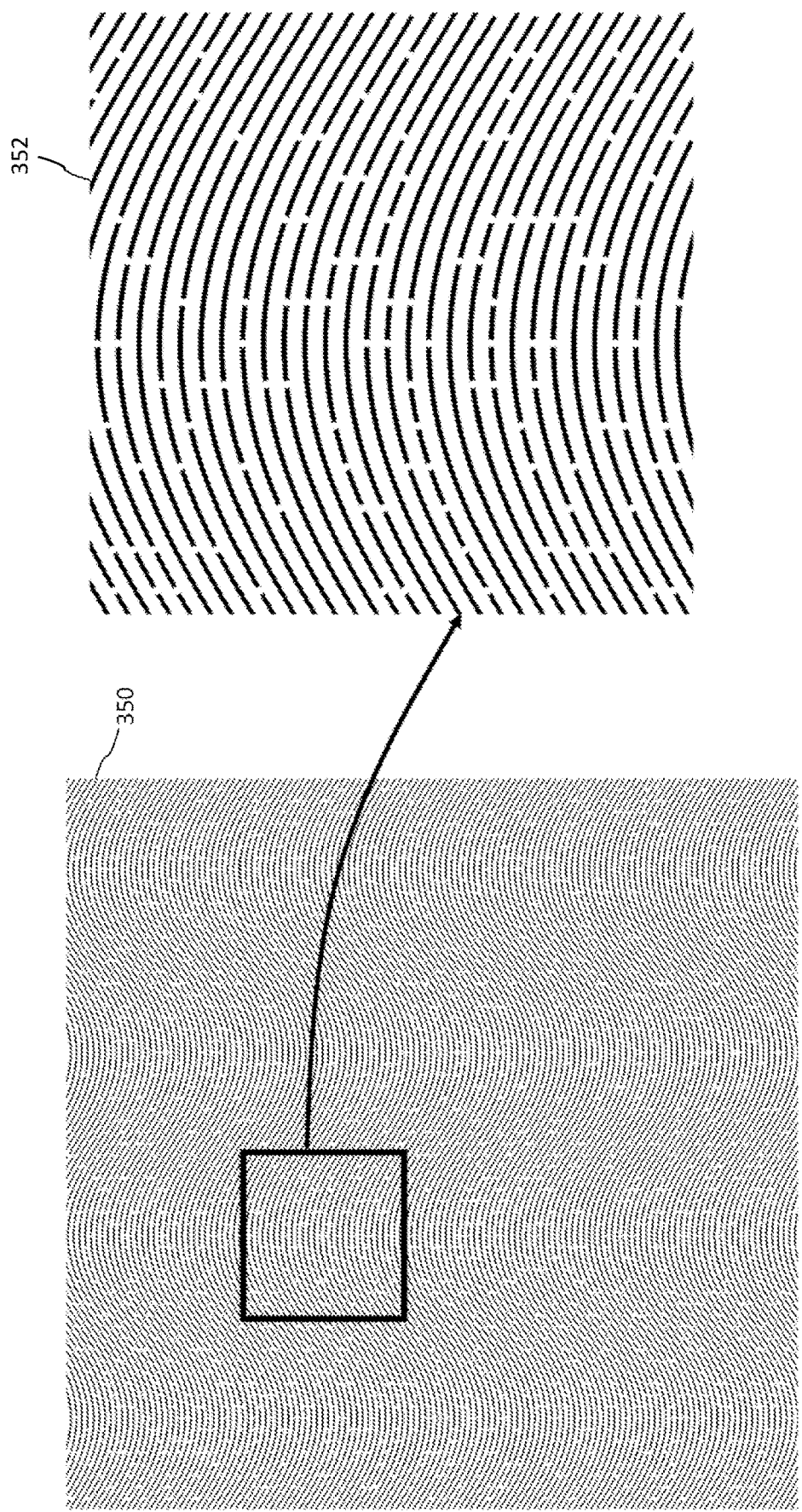
FIG. 14 is a diagram illustrating a more detailed example of line continuity modulation.

FIG. 14 is a diagram illustrating a more detailed example of line continuity modulation. For background on line continuity modulation, please see our U.S. Pat. Nos. 8,144,368 and 7,537,170, which are hereby incorporated by reference. This approach to data modulation is very robust. The encoder controls signal strength and visibility through line break density and length. Preferably, the line breaks are orthogonal to direction of line for good microscopic visibility. Macroscopic visibility is a function of line density and amount of discontinuity. The artwork 350 on the left corresponds to a complete data signal tile (e.g., which varies in size and bit cell density as explained above). On the right, an expanded portion 352 of the tile shows the line continuity modulation.

Figure 15:
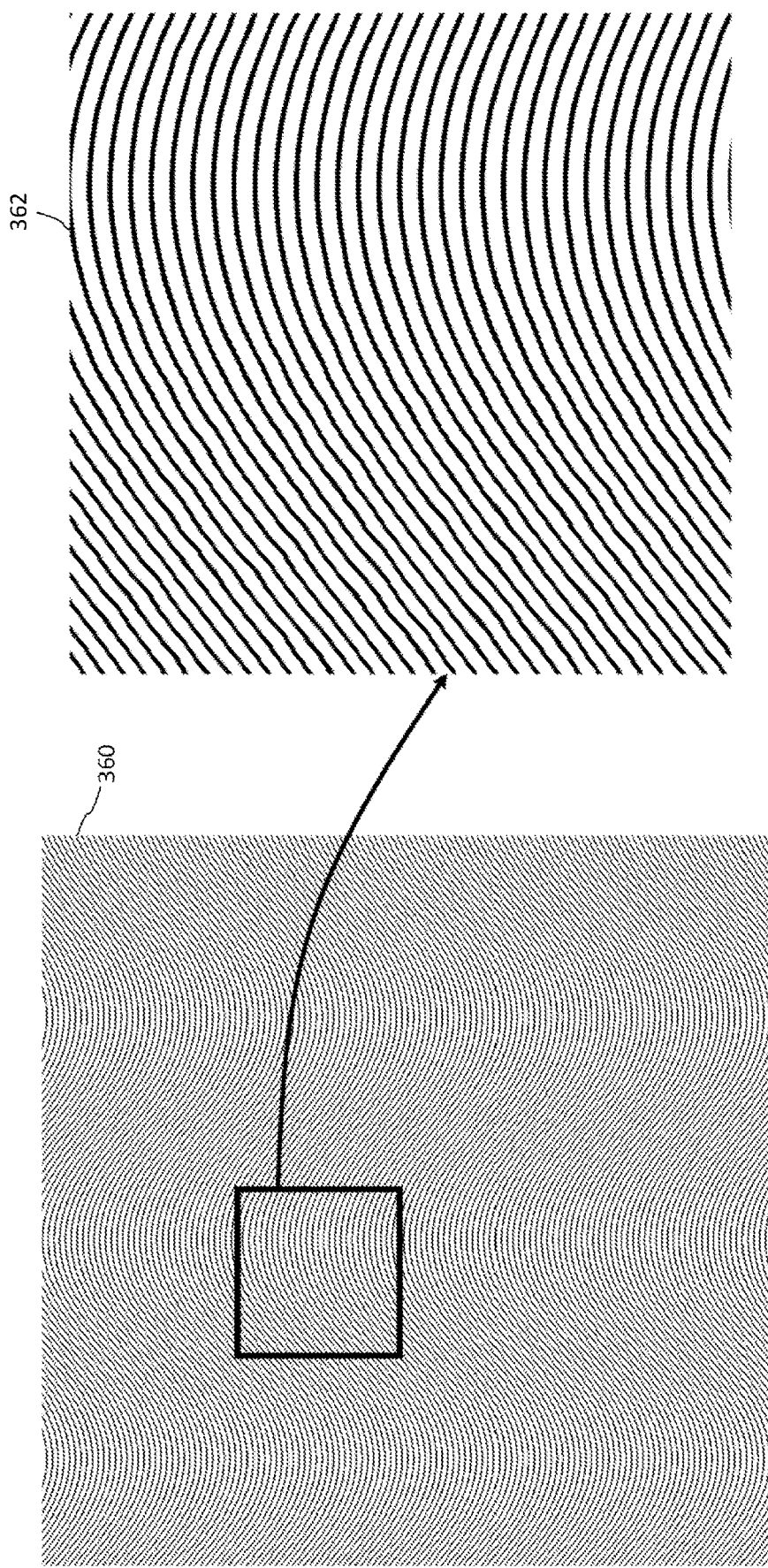
FIG. 15 is a diagram illustrating a more detailed example of line position modulation.

FIG. 15 is a diagram illustrating a more detailed example of line position modulation. The robustness of this approach depends on the artwork. Preferably, the artwork should have omnidirectional spatial frequency distribution to accommodate modulation in the directions of the gradients in the data signal, as it is varies to convey different payloads. The direction of gradients can be designed to be biased to particular directions for a data protocol. Line position modulation can be combined with line width modulation for improved microscopic visibility. The artwork 360 on the left corresponds to a complete data signal tile. On the right, an expanded portion 362 of the tile shows the line position modulation.

Figure 16:
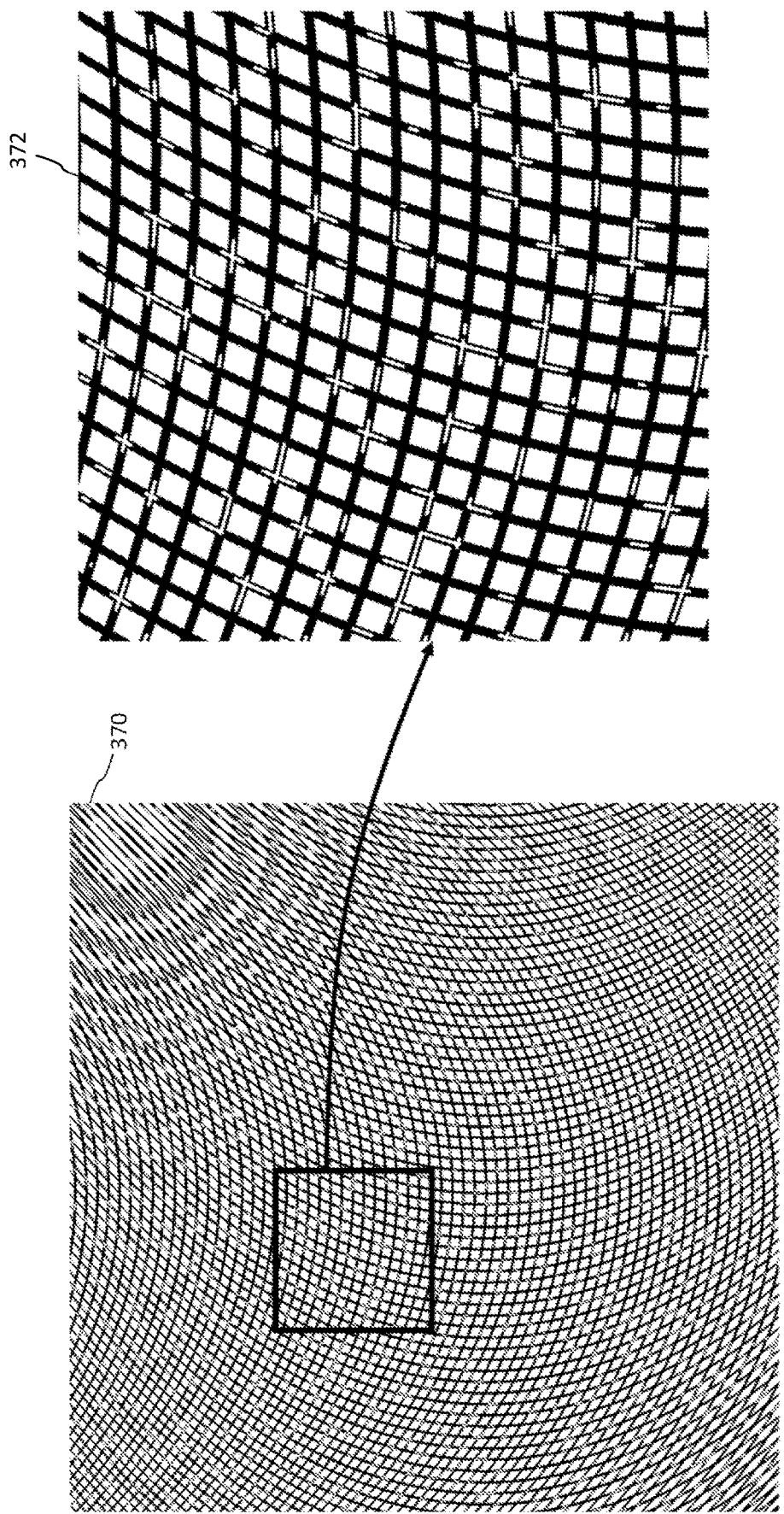
FIG. 16 is a diagram illustrating a more detailed example of line density modulation.

FIG. 16 is a diagram illustrating a more detailed example of line density modulation. This data modulation method is very robust. However, the microscopic visibility may not be as aesthetic as the other schemes. It is easier for the encoder to control visibility through line density and length of the gaps inserted within lines. It requires thick lines with room to remove interior. The artwork 370 on the left corresponds to a complete data signal tile. On the right, an expanded portion 372 of the tile shows the line density modulation.

Figure 17:
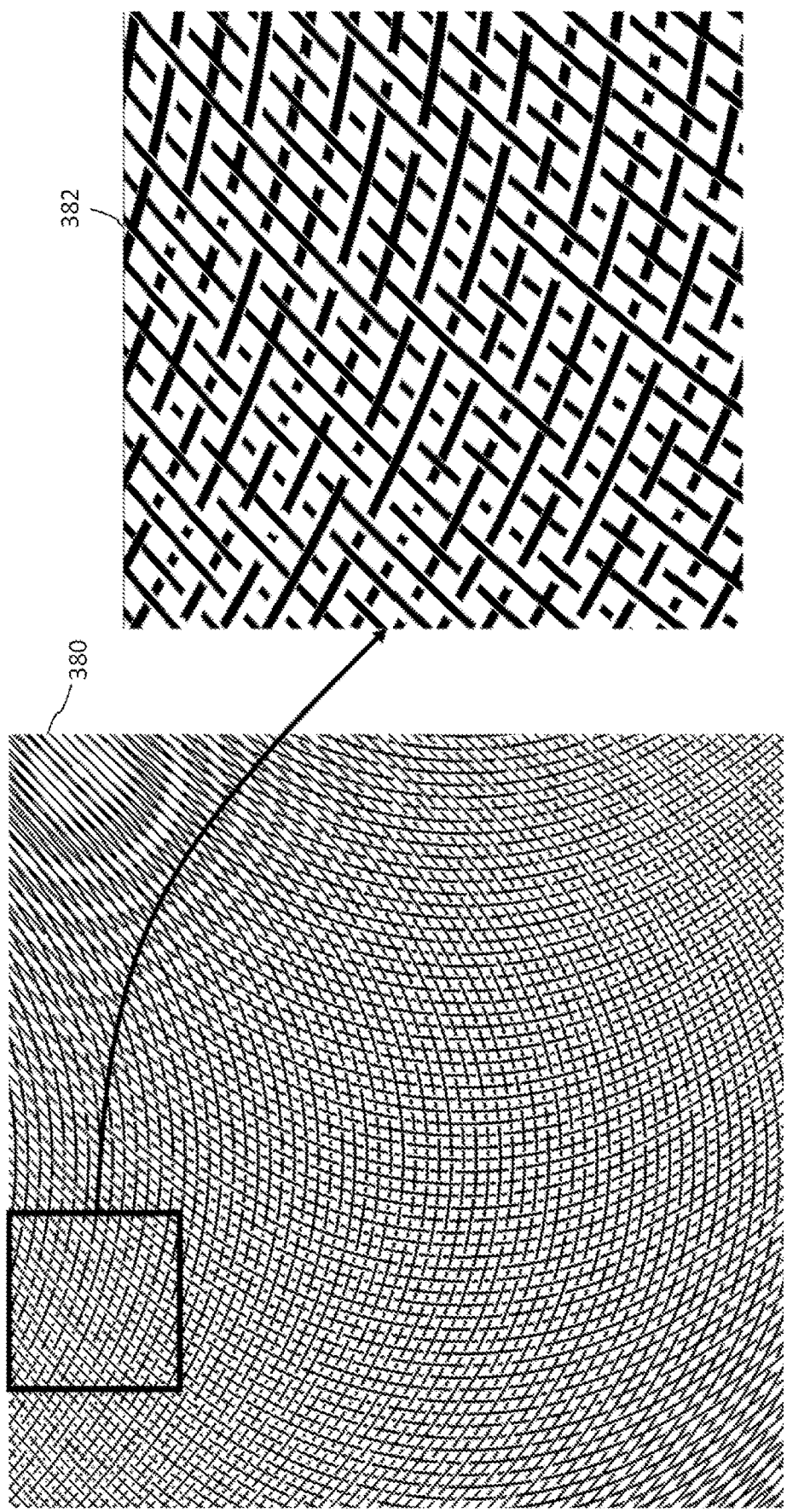
FIG. 17 is a diagram illustrating a more detailed example of line weave modulation.

FIG. 17 is a diagram illustrating a more detailed example of line weave modulation. We found this approach to be less robust than other methods, but its microscopic texture is more appealing. Its macroscopic visibility is similar to line width modulation. It may be applied for artwork designs having cross-hatch structures, such as the ones shown. The artwork 380 on the left corresponds to a complete data signal tile. On the right, an expanded portion 382 of the tile shows the line weave modulation.

Figure 18:
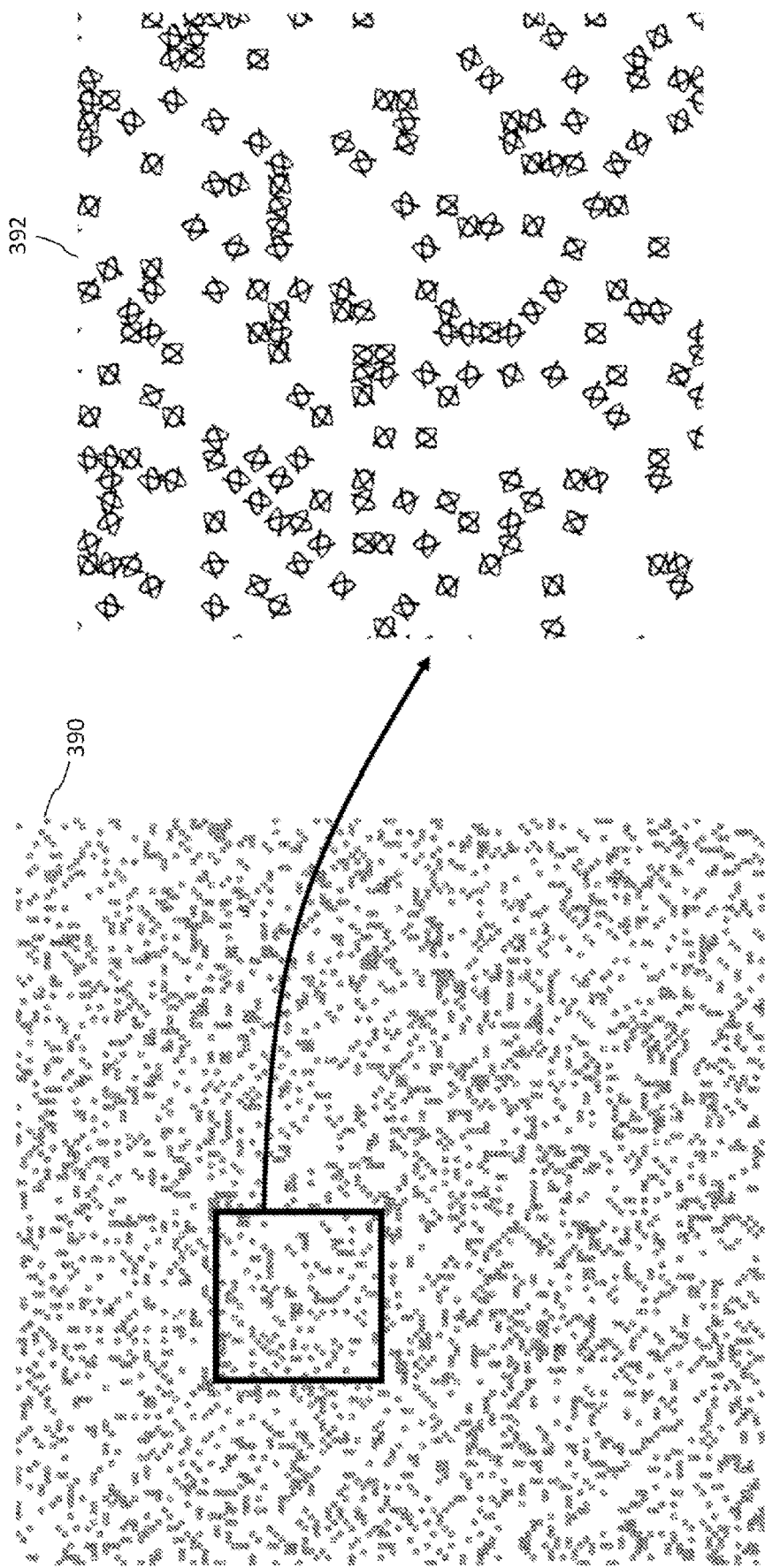
FIG. 18 is a diagram illustrating an example of object position modulation with random print structures.

FIG. 18 is a diagram illustrating an example of object position modulation with random print structures. In this approach, the encoder starts with artwork comprised of graphic elements arranged with a random pattern similar to the one shown in FIG. 18. The encoder moves individual graphic elements to correspond to the gradient of the data signal. The robustness is good. If the designer finds the aesthetic of the texture acceptable, there is no visibility. The resulting texture conveys the data signal. The artwork 390 on the left corresponds to a complete data signal tile. On the right, an expanded portion 392 of the tile shows the line density modulation.

Figure 19:
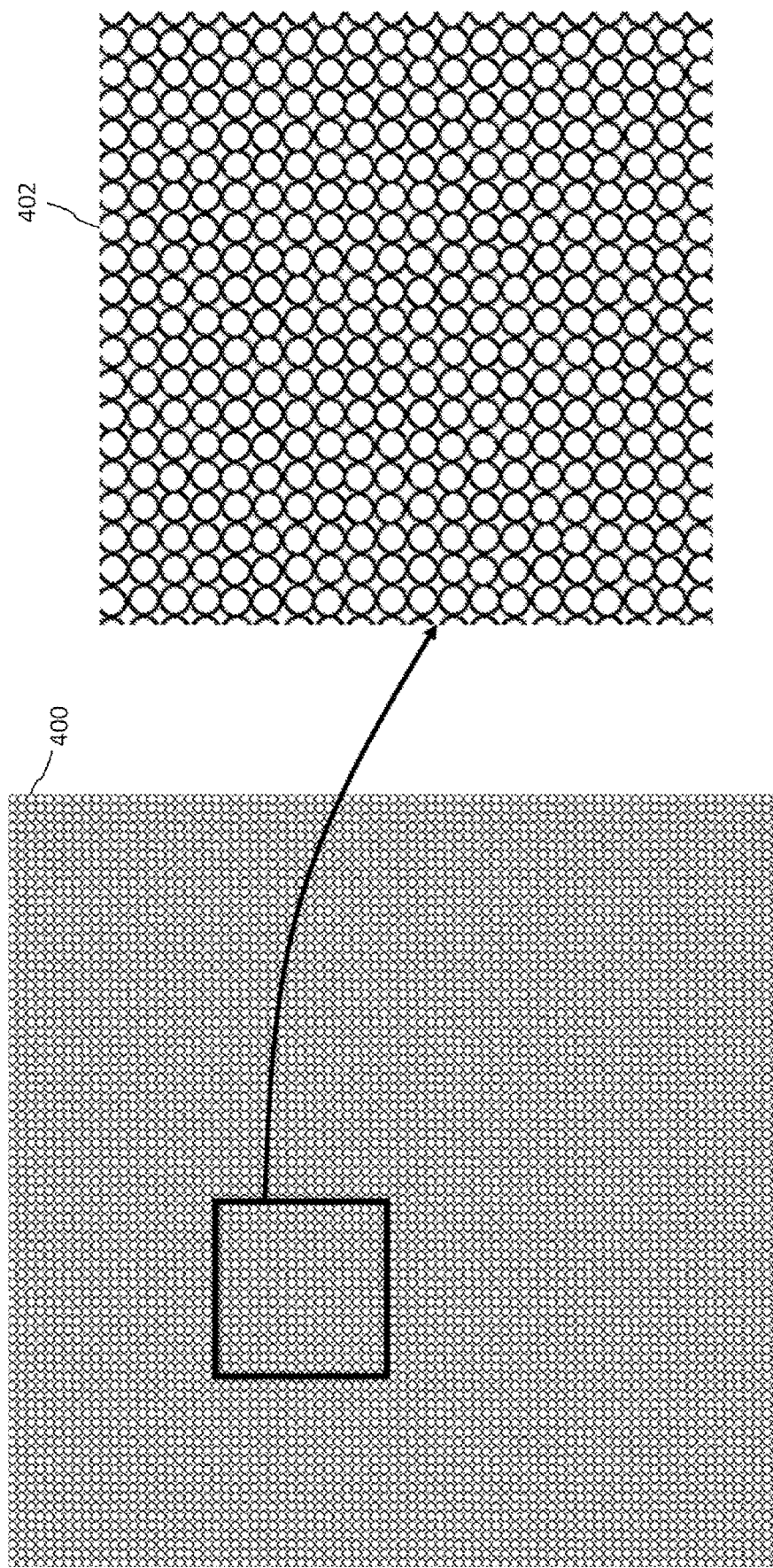
FIG. 19 is a diagram illustrating an example of object position modulation with regular print structures.

FIG. 19 is a diagram illustrating an example of object position modulation with regular print structures. This approach differs from the one depicted in FIG. 18 as it operates on artwork comprised of a regular array (as opposed to random) of graphic elements. The repeated structure of the graphical elements of the texture follows a uniform pattern with spacing that appears the same in horizontal and vertical directions. In this method, the robustness is good, showing that object position modulation can be achieved with regular structures as well as random structure of graphical objects in a tile. Additionally, it has good microscopic visibility. The artwork 400 on the left corresponds to a complete data signal tile. On the right, an expanded portion 402 of the tile shows the line density modulation.

Additional Embodiments of Artwork Generated from a Data Signal

In this section, we describe methods of generating artwork from a raw data signal. In these embodiments, the artwork is generated using commercial software available from Digimarc Corporation. The raw data signal is generated by modulating a flat gray image (50% gray image) with a Digimarc Barcode data signal.

For the sake of illustration, we provide steps to create artwork for two examples, each with details on selected image parameters for each step to create an aesthetic effect of a natural texture pattern.

Example 1

1. Fill a monochromatic (grayscale) Photoshop file with 50% gray.
    a. Do NOT color manage.
    b. 300 DPI
    c. White Background Contents
2. Enhance the file with a Strength 10 setting in the Digimarc Barcode software.
3. Adjustment→Exposure
    a. Default
    b. Exposure: 1.05
    c. Offset: −0.075
    d. Gamma Correction: 0.47
4. Filter→Blur→Motion Blur
    a. Angle: −45 or 45 (whichever direction other than 0, 90, 180, or −90)
    b. Distance: 5 to 10 (5 works best for this style)
5. Image→Adjustment→Threshold
    a. Threshold Level: 185 (+/−5)
6. Save this file out.
7. Open this newly generated file with Adobe Illustrator.
8. Select the image from inside the layers.
9. From the main upper frame of Adobe Illustrator should be an "Image Trace" button
    a. Click Image Trace
    b. After the image has finished Previewing click the Image Trace Panel next to the Drop Down frame showing "default"
    c. From the top line of present icons click the button that shows "Outline"
    d. After the image has finished Previewing, again, click the "Expand" button next to the Drop Down frame showing "Tracing Result"
    e. From here you can increase or decrease the stroke size of your new natural looking enhanced pattern.

Figure 20:
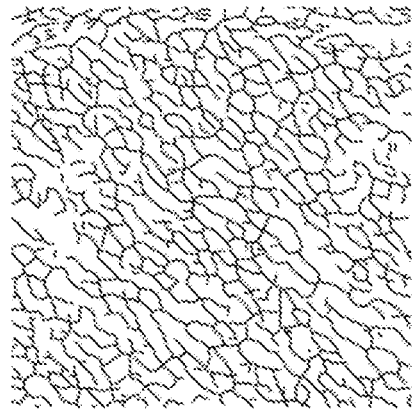
FIG. 20 depicts an example of natural pattern artwork generated by adapting an encoded data signal.

The encoded artwork from this process is shown in FIG. 20. The Photoshop file can be enhanced and masked in different ways to get the grain of the file outputted outlines to travel in expected directions. This can help to make the final product look more natural or more like a structure found in nature (leaves, bark, etc)

Example 2

1. Fill a monochromatic (grayscale) Photoshop file with 50% gray.
    a. Do NOT color manage.
    b. 300 DPI
    c. White Background Contents
2. Enhance the file with a Strength 10 setting in the Digimarc Barcode software.

3. Adjustment→Exposure
   a. Default
   b. Exposure: 1.05
   c. Offset: −0.075
   d. Gamma Correction: 0.3
4. Filter→Blur→Gaussian Blur
   a. Radius: 3 pixels
5. Filter→Stylize→Wind
   a. Method: Wind
   b. Direction: Right or Left (your choice)
6. Image→Adjustment→Threshold
   a. Threshold Level: 140 (+/−5)
7. Save this file out.
8. Open this newly generated file with Adobe Illustrator.
9. Select the image from inside the layers.
10. From the main upper frame of Adobe Illustrator should be an "Image Trace" button
    a. Click Image Trace
    b. After the image has finished Previewing click the Image Trace Panel next to the Drop Down frame showing "default"
    c. From the top line of present icons click the button that shows "Outline"
    d. After the image has finished Previewing, again, click the "Expand" button next to the Drop Down frame showing "Tracing Result"
    e. From here you can increase or decrease the stroke size of your new natural looking enhanced pattern.

Figure 21:
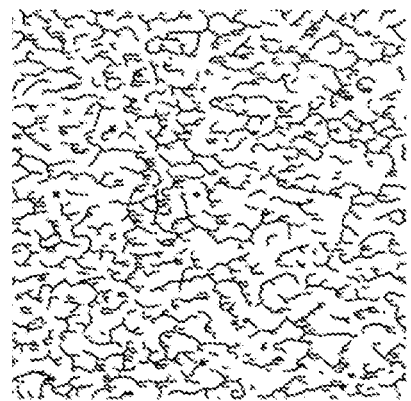
FIG. 21 depicts another example of natural pattern artwork generated by adapting an encoded data signal.

The purpose of this change is to have a more porous final natural pattern. The encoded artwork from this process is shown in FIG. 21.

Operating Environment

The components and operations of the encoder and reader (including data signal decoder) are implemented in modules. Notwithstanding any specific discussion of the embodiments set forth herein, the term "module" refers to software, firmware or circuitry configured to perform any of the methods, processes, functions or operations described herein. Software may be embodied as a software package, code, instructions, instruction sets or data recorded on non-transitory computer readable storage mediums. Software instructions for implementing the detailed functionality can be authored by artisans without undue experimentation from the descriptions provided herein, e.g., written in Matlab, C, C++, Visual Basic, Java, Python, Tcl, Perl, Scheme, Ruby, etc., in conjunction with associated data. Firmware may be embodied as code, instructions or instruction sets or data that are hard-coded (e.g., nonvolatile) in memory devices. As used herein, the term "circuitry" may include, for example, singly or in any combination, hard-wired circuitry, programmable circuitry such as computer processors comprising one or more individual instruction processing cores, state machine circuitry, or firmware that stores instructions executed by programmable circuitry.

Implementation can additionally, or alternatively, employ special purpose electronic circuitry that has been custom-designed and manufactured to perform some or all of the component acts, as an application specific integrated circuit (ASIC). To realize such an implementation, the relevant module(s) (e.g., encoding and decoding of differential modulation within host image or audio content) are first implemented using a general purpose computer, using software such as MATLAB (from Mathworks, Inc.). A tool such as HDLCoder (also available from MathWorks) is next employed to convert the MATLAB model to VHDL (an IEEE standard) or Verilog. The VHDL output is then applied to a hardware synthesis program, such as Design Compiler by Synopsis, HDL Designer by Mentor Graphics, or Encounter RTL Compiler by Cadence Design Systems. The hardware synthesis program provides output data specifying a particular array of electronic logic gates that will realize the technology in hardware form, as a special-purpose machine dedicated to such purpose. This output data is then provided to a semiconductor fabrication contractor, which uses it to produce the customized silicon part. (Suitable contractors include TSMC, Global Foundries, and ON Semiconductors.)

Figure 22:
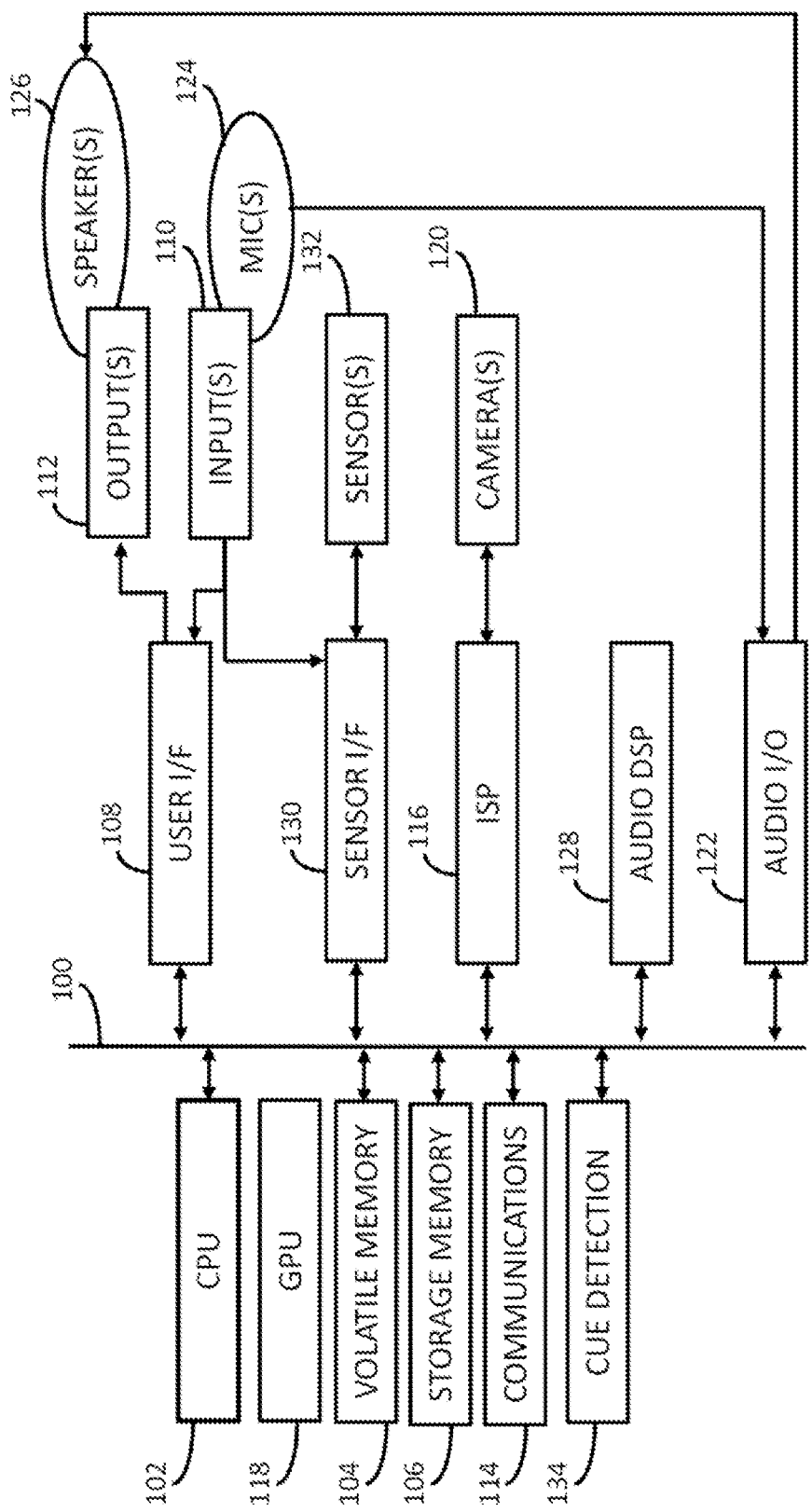
FIG. 22 illustrates an electronic device in which encoding and decoding may be implemented.

For the sake of illustration, FIG. 22 is a diagram of an electronic device in which the components of the above artwork generator, data signal generator, encoder, reader and decoder embodiments may be implemented. It is not intended to be limiting, as the embodiments may be implemented in other device architectures or electronic circuitry.

Referring to FIG. 22, a system for an electronic device includes bus 100, to which many devices, modules, etc., (each of which may be generically referred as a "component") are communicatively coupled. The bus 100 may combine the functionality of a direct memory access (DMA) bus and a programmed input/output (PIO) bus. In other words, the bus 100 may facilitate both DMA transfers and direct CPU read and write instructions. In one embodiment, the bus 100 is one of the Advanced Microcontroller Bus Architecture (AMBA) compliant data buses. Although FIG. 22 illustrates an embodiment in which all components are communicatively coupled to the bus 100, it will be appreciated that one or more sub-sets of the components may be communicatively coupled to a separate bus in any suitable or beneficial manner, and that any component may be communicatively coupled to two or more buses in any suitable or beneficial manner. Although not illustrated, the electronic device can optionally include one or more bus controllers (e.g., a DMA controller, an I2C bus controller, or the like or any combination thereof), through which data can be routed between certain of the components.

The electronic device also includes a CPU 102. The CPU 102 may be a microprocessor, mobile application processor, etc., known in the art (e.g., a Reduced Instruction Set Computer (RISC) from ARM Limited, the Krait CPU product-family, a X86-based microprocessor available from the Intel Corporation including those in the Pentium, Xeon, Itanium, Celeron, Atom, Core i-series product families, etc.). The CPU 102 runs an operating system of the electronic device, runs application programs (e.g., mobile apps such as those available through application distribution platforms such as the Apple App Store, Google Play, etc.) and, optionally, manages the various functions of the electronic device. The CPU 102 may include or be coupled to a read-only memory (ROM) (not shown), which may hold an operating system (e.g., a "high-level" operating system, a "real-time" operating system, a mobile operating system, or the like or any combination thereof) or other device firmware that runs on the electronic device. The electronic device may also include a volatile memory 104 electrically coupled to bus 100. The volatile memory 104 may include, for example, any type of random access memory (RAM). Although not shown, the electronic device may further include a memory controller that controls the flow of data to and from the volatile memory 104. The electronic device may also include a storage memory 106 connected to the bus. The storage memory 106 typically includes one or more non-volatile semiconductor memory devices such as ROM, EPROM and EEPROM, NOR or NAND flash memory, or the like or any combination thereof, and may also include any kind of electronic storage device, such as, for example, magnetic or optical disks. In embodiments of the invention, the storage memory 106 is used to store one or more items of software. Software can include system software, application software, middleware (e.g., Data Distribution Service (DDS) for Real Time Systems, MER, etc.), one or more computer files (e.g., one or more data files, configuration files, library files, archive files, etc.), one or more software components, or the like or any stack or other combination thereof.

Examples of system software include operating systems (e.g., including one or more high-level operating systems, real-time operating systems, mobile operating systems, or the like or any combination thereof), one or more kernels, one or more device drivers, firmware, one or more utility programs (e.g., that help to analyze, configure, optimize, maintain, etc., one or more components of the electronic device), and the like. Application software typically includes an application program that helps users solve problems, perform tasks, render media content, retrieve (or access, present, traverse, query, create, organize, etc.) information or information resources on a network (e.g., the World Wide Web), a web server, a file system, a database, etc. Examples of software components include device drivers, software CODECs, message queues or mailboxes, databases, etc. A software component can also include other data or parameter to be provided to application software, a web application, or the like or any combination thereof. Examples of data files include image files, text files, audio files, video files, haptic signature files, and the like.

Also connected to the bus 100 is a user interface module 108. The user interface module 108 is configured to facilitate user control of the electronic device. Thus the user interface module 108 may be communicatively coupled to one or more user input devices 110. A user input device 110 can, for example, include a button, knob, touch screen, trackball, mouse, microphone (e.g., an electret microphone, a MEMS microphone, or the like or any combination thereof), an IR or ultrasound-emitting stylus, an ultrasound emitter (e.g., to detect user gestures, etc.), one or more structured light emitters (e.g., to project structured IR light to detect user gestures, etc.), one or more ultrasonic transducers, or the like or any combination thereof.

The user interface module 108 may also be configured to indicate, to the user, the effect of the user's control of the electronic device, or any other information related to an operation being performed by the electronic device or function otherwise supported by the electronic device. Thus the user interface module 108 may also be communicatively coupled to one or more user output devices 112. A user output device 112 can, for example, include a display (e.g., a liquid crystal display (LCD), a light emitting diode (LED) display, an active-matrix organic light-emitting diode (AMOLED) display, an e-ink display, etc.), a light, a buzzer, a haptic actuator, a loud speaker, or the like or any combination thereof.

Generally, the user input devices 110 and user output devices 112 are an integral part of the electronic device; however, in alternate embodiments, any user input device 110 (e.g., a microphone, etc.) or user output device 112 (e.g., a loud speaker, haptic actuator, light, display, or printer) may be a physically separate device that is communicatively coupled to the electronic device (e.g., via a communications module 114). A printer encompasses different devices for applying our artwork carrying digital data to objects, such as 2D and 3D printers (intaglio, ink jet, offset, flexographic, laser, gravure, etc.), and equipment for etching, engraving, embossing, or laser marking.

Although the user interface module 108 is illustrated as an individual component, it will be appreciated that the user interface module 108 (or portions thereof) may be functionally integrated into one or more other components of the electronic device (e.g., the CPU 102, the sensor interface module 130, etc.).

Also connected to the bus 100 is an image signal processor 116 and a graphics processing unit (GPU) 118. The image signal processor (ISP) 116 is configured to process imagery (including still-frame imagery, video imagery, or the like or any combination thereof) captured by one or more cameras 120, or by any other image sensors, thereby generating image data. General functions typically performed by the ISP 116 can include Bayer transformation, demosaicing, noise reduction, image sharpening, or the like or combinations thereof. The GPU 118 can be configured to process the image data generated by the ISP 116, thereby generating processed image data. General functions typically performed by the GPU 118 include compressing image data (e.g., into a JPEG format, an MPEG format, or the like or combinations thereof), creating lighting effects, rendering 3D graphics, texture mapping, calculating geometric transformations (e.g., rotation, translation, etc.) into different coordinate systems, etc. and sending the compressed video data to other components of the electronic device (e.g., the volatile memory 104) via bus 100. The GPU 118 may also be configured to perform one or more video decompression or decoding processes. Image data generated by the ISP 116 or processed image data generated by the GPU 118 may be accessed by the user interface module 108, where it is converted into one or more suitable signals that may be sent to a user output device 112 such as a display, printer or speaker.

Also coupled to the bus 100 is an audio I/O module 122, which is configured to encode, decode and route data to and from one or more microphone(s) 124 (any of which may be considered a user input device 110) and loud speaker(s) 126 (any of which may be considered a user output device 110). For example, sound can be present within an ambient, aural environment (e.g., as one or more propagating sound waves) surrounding the electronic device. A sample of such ambient sound can be obtained by sensing the propagating sound wave(s) using one or more microphones 124, and the microphone(s) 124 then convert the sensed sound into one or more corresponding analog audio signals (typically, electrical signals), thereby capturing the sensed sound. The signal(s) generated by the microphone(s) 124 can then be processed by the audio I/O module 122 (e.g., to convert the analog audio signals into digital audio signals) and thereafter output the resultant digital audio signals (e.g., to an audio digital signal processor (DSP) such as audio DSP 128, to another module such as a song recognition module, a speech recognition module, a voice recognition module, etc., to the volatile memory 104, the storage memory 106, or the like or any combination thereof). The audio I/O module 122 can also receive digital audio signals from the audio DSP 128, convert each received digital audio signal into one or more corresponding analog audio signals and send the analog audio signals to one or more loudspeakers 126. In one embodiment, the audio I/O module 122 includes two communication channels (e.g., so that the audio I/O module 122 can transmit generated audio data and receive audio data simultaneously).

The audio DSP 128 performs various processing of digital audio signals generated by the audio I/O module 122, such as compression, decompression, equalization, mixing of audio from different sources, etc., and thereafter output the processed digital audio signals (e.g., to the audio I/O module 122, to another module such as a song recognition module, a speech recognition module, a voice recognition module, etc., to the volatile memory 104, the storage memory 106, or the like or any combination thereof). Generally, the audio DSP 128 may include one or more microprocessors, digital signal processors or other microcontrollers, programmable logic devices, or the like or combination thereof. The audio DSP 128 may also optionally include cache or other local memory device (e.g., volatile memory, non-volatile memory or a combination thereof), DMA channels, one or more input buffers, one or more output buffers, and any other component facilitating the functions it supports (e.g., as described herein). In one embodiment, the audio DSP 128 includes a core processor (e.g., an ARM® AudioDE™ processor, a Hexagon processor (e.g., QDSP6V5A)), as well as a data memory, program memory, DMA channels, one or more input buffers, one or more output buffers, etc. Although the audio I/O module 122 and the audio DSP 128 are illustrated as separate components, it will be appreciated that the audio I/O module 122 and the audio DSP 128 can be functionally integrated together. Further, it will be appreciated that the audio DSP 128 and other components such as the user interface module 108 may be (at least partially) functionally integrated together.

The aforementioned communications module 114 includes circuitry, antennas, sensors, and any other suitable or desired technology that facilitates transmitting or receiving data (e.g., within a network) through one or more wired links (e.g., via Ethernet, USB, FireWire, etc.), or one or more wireless links (e.g., configured according to any standard or otherwise desired or suitable wireless protocols or techniques such as Bluetooth, Bluetooth Low Energy, WiFi, WiMAX, GSM, CDMA, EDGE, cellular 3G or LTE, Li-Fi (e.g., for IR- or visible-light communication), sonic or ultrasonic communication, etc.), or the like or any combination thereof. In one embodiment, the communications module 114 may include one or more microprocessors, digital signal processors or other microcontrollers, programmable logic devices, or the like or combination thereof. Optionally, the communications module 114 includes cache or other local memory device (e.g., volatile memory, non-volatile memory or a combination thereof), DMA channels, one or more input buffers, one or more output buffers, or the like or combination thereof. In one embodiment, the communications module 114 includes a baseband processor (e.g., that performs signal processing and implements real-time radio transmission operations for the electronic device).

Also connected to the bus 100 is a sensor interface module 130 communicatively coupled to one or more sensors 132. A sensor 132 can, for example, include an accelerometer (e.g., for sensing acceleration, orientation, vibration, etc.), a magnetometer (e.g., for sensing the direction of a magnetic field), a gyroscope (e.g., for tracking rotation or twist), a barometer (e.g., for sensing altitude), a moisture sensor, an ambient light sensor, an IR or UV sensor or other photodetector, a pressure sensor, a temperature sensor, an acoustic vector sensor (e.g., for sensing particle velocity), a galvanic skin response (GSR) sensor, an ultrasonic sensor, a location sensor (e.g., a GPS receiver module, etc.), a gas or other chemical sensor, or the like or any combination thereof. Although separately illustrated in FIG. 22, any camera 120 or microphone 124 can also be considered a sensor 132. Generally, a sensor 132 generates one or more signals (typically, electrical signals) in the presence of some sort of stimulus (e.g., light, sound, moisture, gravitational field, magnetic field, electric field, etc.), in response to a change in applied stimulus, or the like or any combination thereof. In one embodiment, all sensors 132 coupled to the sensor interface module 130 are an integral part of the electronic device; however, in alternate embodiments, one or more of the sensors may be physically separate devices communicatively coupled to the electronic device (e.g., via the communications module 114). To the extent that any sensor 132 can function to sense user input, then such sensor 132 can also be considered a user input device 110. The sensor interface module 130 is configured to activate, deactivate or otherwise control an operation (e.g., sampling rate, sampling range, etc.) of one or more sensors 132 (e.g., in accordance with instructions stored internally, or externally in volatile memory 104 or storage memory 106, ROM, etc., in accordance with commands issued by one or more components such as the CPU 102, the user interface module 108, the audio DSP 128, the cue detection module 134, or the like or any combination thereof). In one embodiment, sensor interface module 130 can encode, decode, sample, filter or otherwise process signals generated by one or more of the sensors 132. In one example, the sensor interface module 130 can integrate signals generated by multiple sensors 132 and optionally process the integrated signal(s). Signals can be routed from the sensor interface module 130 to one or more of the aforementioned components of the electronic device (e.g., via the bus 100). In another embodiment, however, any signal generated by a sensor 132 can be routed (e.g., to the CPU 102), before being processed.

Generally, the sensor interface module 130 may include one or more microprocessors, digital signal processors or other microcontrollers, programmable logic devices, or the like or any combination thereof. The sensor interface module 130 may also optionally include cache or other local memory device (e.g., volatile memory, non-volatile memory or a combination thereof), DMA channels, one or more input buffers, one or more output buffers, and any other component facilitating the functions it supports (e.g., as described above). In one embodiment, the sensor interface module 130 may be provided as the "Sensor Core" (Sensors Processor Subsystem (SPS)) from Qualcomm, the "frizz" from Megachips, or the like or any combination thereof. Although the sensor interface module 130 is illustrated as an individual component, it will be appreciated that the sensor interface module 130 (or portions thereof) may be functionally integrated into one or more other components (e.g., the CPU 102, the communications module 114, the audio I/O module 122, the audio DSP 128, the cue detection module 134, or the like or any combination thereof).

Exemplary Features

In this section, we provide some exemplary features.

A1. A method of generating artwork carrying a machine readable data signal, the method comprising:
  obtaining artwork;
  generating a data signal from a digital payload;
  editing the artwork according to the data signal to produce output artwork carrying the digital payload.

A2. The method of A1 further comprising:
  measuring robustness of the data signal at spatial blocks within the output artwork to determine a robustness metric per spatial block;
  identifying areas with weak data signal from the robustness metric per spatial block; and
  updating the editing of the artwork at the areas with weak data signal by inserting additional graphic elements according to the data signal.

A3. The method of any of the previous methods A1-A2 wherein the editing comprises moving position of graphic objects according to a signal gradient of the data signal.

A4. The method of any of the previous methods A1-A3 wherein the editing comprises editing line density of line elements by removing interior of the line element according to the data signal.

A5. The method of any of the previous methods A1-A4 wherein the editing comprises inserting a gap at intersections of line elements according to the data signal.

A6. The method of any of the previous methods A1-A5 wherein the editing comprises inserting graphical elements into the artwork according to the data signal.

A7. The method of any of the previous methods A1-A6 comprising converting the artwork to skeletal representation and editing the skeletal representation according to the data signal.

A8. The method of A7 wherein the converting comprises computing a medial axis transform of the artwork, and the editing comprises editing the medial axis transform according to the data signal.

A9. A method of any of the previous methods A1-A8 wherein generating the data signal comprises:
error correction coding the payload, modulating a carrier with the payload to produce modulated payload elements; and
mapping the modulated payload elements to locations within a rectangular data tile;
wherein the editing comprises editing the artwork at locations according to the modulated payload elements at the locations.

A10. The method of A9 comprising repeating the data tile in contiguous blocks of the artwork.

A11. The method of any of the previous methods A1-A9 wherein generating the data signal comprises:
generating payload carrying and synchronization signal components; and
prioritizing the payload carrying and synchronization components.

A12. The method of A11 comprising optimizing the prioritizing of the components by measuring robustness at different ratios of the signal components; and selecting a ratio of signal components based on the measured robustness.

A13. A non-transitory computer readable medium on which is stored instructions, which when executed by a processor, perform a method of any of the previous methods A1-A12.

A14. A method of generating artwork carrying a machine-readable data signal, the method comprising:
generating a data signal from a digital payload;
mapping the data signal to spatial locations to form an image of the data signal;
transforming data signal elements in the image according to a filter of shape or directionality that corresponds to a desired aesthetic effect;
skeletonizing the data signal into a skeletal representation;
editing the skeletal representation with morphological operations; and
converting the skeletal representation to an image of artwork for application to an object, the artwork carrying the digital payload.

A15. The method of A14 further comprising:
measuring robustness of the data signal at spatial blocks within the output artwork to determine a robustness metric per spatial block;
identifying areas with weak data signal from the robustness metric per spatial block; and
updating the areas with weak data signal by adjusting parameters of the morphological operators.

A16. The method of any of the previous methods A14-15 wherein the editing comprises dilating or eroding stroke width of the skeletal representation.

A17. The method of any of the previous methods A14-16 wherein the editing comprises smoothing corners.

A18. The method of any of the previously methods A14-17 comprising thresholding the image of the data signal prior to skeletonizing to convert the image to a quantized form of two or more pixel values per data signal element location within the image.

A19. The method of any of the previous methods A14-18 wherein the skeletonizing comprises computing a medial axis transform of the artwork, and the editing comprises editing the medial axis transform.

A20. A method of any of the previous methods A14-19 wherein generating the data signal comprises:
error correction coding the payload, modulating a carrier with the payload to produce modulated payload elements; and
mapping the modulated payload elements to locations within a rectangular data tile;
wherein the editing comprises editing the artwork at locations according to the modulated payload elements at the locations.

A21. The method of A20 comprising repeating the data tile in contiguous blocks to form the artwork, in which the payload is repeated in instances of the data tile.

A22. The method of any of the previous methods A14-21 wherein generating the data signal comprises:
generating payload carrying and synchronization signal components; and
prioritizing the payload carrying and synchronization components.

A23. The method of method A22 comprising optimizing the prioritizing of the components by measuring robustness at different ratios of the signal components; and selecting a ratio of signal components based on the measured robustness.

A24. A non-transitory computer readable medium on which is stored instructions, which when executed by a processor, perform a method of any of the previous methods A14-A23.

CONCLUDING REMARKS

Having described and illustrated the principles of the technology with reference to specific implementations, it will be recognized that the technology can be implemented in many other, different, forms. To provide a comprehensive disclosure without unduly lengthening the specification, applicants incorporate by reference the patents and patent applications referenced above.

The methods, processes, and systems described above may be implemented in hardware, software or a combination of hardware and software. For example, the signal processing operations for distinguishing among sources and calculating position may be implemented as instructions stored in a memory and executed in a programmable computer (including both software and firmware instructions), implemented as digital logic circuitry in a special purpose digital circuit, or combination of instructions executed in one or more processors and digital logic circuit modules. The methods and processes described above may be implemented in programs executed from a system's memory (a computer readable medium, such as an electronic, optical or magnetic storage device).

The particular combinations of elements and features in the above-detailed embodiments are exemplary only; the interchanging and substitution of these teachings with other teachings in this and the incorporated-by-reference patents/applications are also contemplated.

We claim:

1. A method of generating artwork carrying a machine-readable data signal, the method comprising:
obtaining artwork;
generating a data signal from a digital payload, the generating comprising generating payload carrying and synchronization signal components;
prioritizing the payload carrying and synchronization components by applying a weighting to the components derived from measuring robustness at different ratios of the signal components, and selecting a ratio of signal components based on the measured robustness; and
editing the artwork according to the data signal to produce output artwork carrying the digital payload.

2. The method of claim 1 further comprising:
measuring robustness of the data signal at spatial blocks within the output artwork to determine a robustness metric per spatial block;
identifying areas with weak data signal from the robustness metric per spatial block; and
updating the editing of the artwork at the areas with weak data signal by inserting additional graphic elements according to the data signal.

3. The method of claim 1 wherein the editing comprises moving position of graphic objects according to a signal gradient of the data signal.

4. The method of claim 1 wherein the editing comprises editing line density of line elements by removing interior of the line element according to the data signal.

5. The method of claim 1 wherein the editing comprises inserting a gap at intersections of line elements according to the data signal.

6. The method of claim 1 wherein the editing comprises inserting graphical elements into the artwork according to the data signal.

7. The method of claim 1 comprising converting the artwork to skeletal representation and editing the skeletal representation according to the data signal.

8. The method of claim 7 wherein the converting comprises computing a medial axis transform of the artwork, and the editing comprises editing the medial axis transform according to the data signal.

9. A method of claim 1 wherein generating the data signal comprises:
error correction coding the payload, modulating a carrier with the payload to produce modulated payload elements; and
mapping the modulated payload elements to locations within a rectangular data tile;
wherein the editing comprises editing the artwork at locations according to the modulated payload elements at the locations.

10. The method of claim 9 comprising repeating the data tile in contiguous blocks of the artwork.

11. A non-transitory computer readable medium on which is stored instructions, which when executed by a processor, perform a method of claim 1.

12. A method of generating artwork carrying a machine-readable data signal, the method comprising:
generating a data signal from a digital payload;
mapping the data signal to spatial locations to form an image of the data signal;
transforming data signal elements in the image according to a filter of shape or directionality that corresponds to desired aesthetic effect;
skeletonizing the data signal into a skeletal representation;
editing the skeletal representation with morphological operations; and
converting the skeletal representation to an image of artwork for application to an object, the artwork carrying the digital payload.

13. The method of claim 12 further comprising:
measuring robustness of the data signal at spatial blocks within the output artwork to determine a robustness metric per spatial block;
identifying areas with weak data signal from the robustness metric per spatial block; and
updating the areas with weak data signal by adjusting parameters of the morphological operators.

14. The method of claim 12 wherein the editing comprises dilating or eroding stroke width of the skeletal representation.

15. The method of claim 12 wherein the editing comprises smoothing corners.

16. The method of any of claim 12 comprising thresholding the image of the data signal prior to skeletonizing to convert the image to a quantized form of two or more pixel values per data signal element location within the image.

17. The method of claim 12 wherein the skeletonizing comprises computing a medial axis transform of the artwork, and the editing comprises editing the medial axis transform.

18. A method of claim 12 generating the data signal comprises:
error correction coding the payload, modulating a carrier with the payload to produce modulated payload elements; and
mapping the modulated payload elements to locations within a rectangular data tile;
wherein the editing comprises editing the artwork at locations according to the modulated payload elements at the locations.

19. The method of claim 18 comprising repeating the data tile in contiguous blocks to form the artwork, in which the payload is repeated in instances of the data tile.

20. The method of claim 12 wherein generating the data signal comprises:
generating payload carrying and synchronization signal components; and
prioritizing the payload carrying and synchronization components.

21. The method of claim 20 comprising optimizing the prioritizing of the components by measuring robustness at different ratios of the signal components; and selecting a ratio of signal components based on the measured robustness.

22. A non-transitory computer readable medium on which is stored instructions, which when executed by a processor, perform a method of claim 12.

* * * * *